US012794907B2

(12) United States Patent
Chacko

(10) Patent No.: US 12,794,907 B2
(45) **Date of Patent: *Nov. 10, 2026**

(54) SYSTEM AND A METHOD TO IMPLEMENT SECURE STORAGE ROUTING OVERLAY NETWORK

(71) Applicant: Peter Chacko, Ernakulam (IN)

(72) Inventor: Peter Chacko, Ernakulam (IN)

(73) Assignee: Peter Chacko (IN)

( * ) Notice: Subject to any disclaimer, the term of this patent is extended or adjusted under 35 U.S.C. 154(b) by 37 days.

This patent is subject to a terminal disclaimer.

(21) Appl. No.: 18/958,942

(22) Filed: Nov. 25, 2024

(65) Prior Publication Data

US 2025/0097240 A1 Mar. 20, 2025

Related U.S. Application Data

(63) Continuation of application No. 17/352,043, filed on Jun. 18, 2021, now Pat. No. 12,184,667.

(30) Foreign Application Priority Data

Jun. 18, 2020 (IN) ............................ 202041025747

(51) Int. Cl.
*H04L 9/40* (2022.01)

(52) U.S. Cl.
CPC .......... *H04L 63/1416* (2013.01); *H04L 63/20* (2013.01)

(58) Field of Classification Search
CPC ............................ H04L 63/1416; H04L 63/20
USPC ............................................................ 726/23
See application file for complete search history.

(56) References Cited

U.S. PATENT DOCUMENTS

| | | | | |
|---|---|---|---|---|
| 2017/0288704 | A1* | 10/2017 | Trusov | H03M 13/373 |
| 2020/0133771 | A1* | 4/2020 | Goyal | H03M 13/1515 |
| 2020/0401483 | A1* | 12/2020 | Goyal | H03M 13/154 |

* cited by examiner

*Primary Examiner* — Michael S McNally

(57) ABSTRACT

A system to implement secure storage routing overlay network is disclosed. The system includes a plurality of content forwarding router (CFR) nodes placed at a plurality of locations spanning countries and continents and a Universal Security Controller (USC) node that receives telemetry data sent from the plurality of CFR nodes. The USC node is communicatively connected to the plurality of CFR nodes for populating and updating node state information to the plurality of CFR nodes. The USC node exchange executable instructions with the plurality of CFR nodes and further comprising the steps of creating split partition (SP) fragments at an ingress CFR node, updating each SP Fragment with an exclusive CFR List at the ingress CFR node, moving the SP fragments from the ingress CFR node to an egress CFR node across an exclusive list of CFR nodes, and terminating content transport at the egress CFR node.

5 Claims, 18 Drawing Sheets

DTG1 < ---------- > DTG 5

| | | | |
|---|---|---|---|
| DTG 1 | DTG 4 | DTG 3 | DTG 5 |
| DTG 1 | DTG 2 | DTG 5 | X |
| DTG 1 | DTG 6 | DTG 5 | X |

Fig 14

TABLE 1

| INTRUSION EVENT | CODES |
|---|---|
| NONE | 01 |
| INSIDER THEFT | 02 |
| RANSOMEWARE ATTACK | 03 |
| CYBER ATTACK | 04 |
| SYSTEM ISSUES | 05 |

Fig 15

SYSTEM AND A METHOD TO IMPLEMENT SECURE STORAGE ROUTING OVERLAY NETWORK

CROSS REFERENCE APPLICATIONS

This application is a continuation application claiming priority to U.S. patent application Ser. No. 17/352,043 filed Jun. 18, 2021, which is hereby incorporated by reference for all purposes.

TECHNICAL FIELD OF THE INVENTION

The present disclosure is related to data storage intrusion mitigation, information theoretic security in-motion and at-rest, targeting storage intrusion attacks such as ransomware, malicious insiders, and nation-funded wiretapping attacks in-motion as part of cyber-warfare. Invention provides adequate protection from quantum computing attacks breaking existing encryption based crypto systems, with information theoretical security as opposed to computational security. Invention combines various IT Risk mitigation mechanisms, security methods at-rest using de-centralized secure data vaulting and security methods in-motion using secure Exclusive-Path inter-country storage routing overlay network, covering data storage security at-rest and in-motion with a unique architecture, and set of methods.

BACKGROUND

Conventional Storage systems have been built with primary goals of performance of a storage system, scalability, and reliability aspects. It was assumed that data can be stored inside a secure perimeter of a corporation and hence network security systems would protect data from external attacks. Such storage systems added security on a "Bolted on" approach rather than "Bolted in" Approach by design. Encryption, authentication, and identity management offer good amount of security but not built as an integrated solution and does not look at end to end perspective over data lifecycle when data is at-rest and in-motion. Conventional storage systems do not address end to end data-centric security in-transit in the context of quantum computing attacks on encrypted data streams. In the present disclosure, a list of methods, System and architecture to detect intrusions to storage systems, mitigating it and securing storage at rest and in-motion with information theory, secure content forwarding across an overlay tunnel and system security techniques.

SUMMARY OF THE INVENTION

The present disclosure relates to a set of methods and architecture for implementing cyber risk mitigation and information security services on data at-rest and data in-motion. The present disclosure also applies to real time storage intrusion detection and active response for protecting data across on Premise, IaaS, PaaS, SaaS data sources, Cloud-Native platforms and hybrid-storage clouds as the invention can be applied to any type of IT platforms. Multiple embodiments can be created out of the invention applying to only a subset of the attack scenarios, such as a solution only for data in-motion or exclusive for security at-rest or both aspects.

The unique aspects of the present disclosure disclose the active response capabilities of a storage system having various data protection services against a threat detected, a way data is stored in isolated, secure vaults, and how storage data is migrated or transferred across borders of security domains or jurisdictions with Exclusive-Path content routing. The present disclosure discloses a security feature by architecture particularly used to mitigate cyber security risks. The present disclosure shows the end-to-end security and safety guarantees for the data during data movements and at rest with quantum-safe data security leveraging, aspects related to information theoretical security as opposed to computational security. Computational security can be challenged and can be broken by quantum computing resources, which is extremely fast for certain computations such as the mathematic side of the encryption whereas information theoretical security is safe in the face of quantum computing based attacks, unless the attacker gets hold of a majority sum of the pieces of the data blocks which is extremely difficult. The present disclosure discloses novel ways of securing data from crypto attacks, ransomware attacks, wiretapping and quantum attacks, and insider attacks and thereby provides a life-cycled, end to end solution converging safety and security. Such a solution is unheard in the security industry and enables new use cases and improves the security and data control radically. The present disclosure discloses multi-vectored, multi-layered security services built into data storage systems. Solution is multi-layered as multiple methods are offering independent aspects of security capabilities. Invention is multi-vectored because the invention blends mathematics, system security aspects, secure network isolation, Exclusive-Path content routing combining novel methods from multiple domains of IT architecture.

In one embodiment, the present disclosure discloses about protection from data thefts, ransomware attack in real time with active responses. Conventional storage systems only audit or send alerts in some cases, which is not paired with real time active responses. Conventional storage systems still have drawbacks associated with data intrusion, ransomware attacks, and various forms of data leakage through wiretapping. The present disclosure discloses disaggregated security services that include storage activity monitoring and active response to attacks, where actual data is protected in multi-segmented, logically air-gapped, immutable data vaults. These multi-segmented vaults make use of various forms of information theory to make it safe from quantum computing attacks.

BRIEF DESCRIPTION OF DRAWINGS

FIG. 14 is a table indicating an example of an exclusive CFR List used in the overlay.

FIG. 15 is a table indicating RIDE parameters and RIM codes used at USC controller.

DETAILED DESCRIPTION OF THE INVENTION

Figure 1:
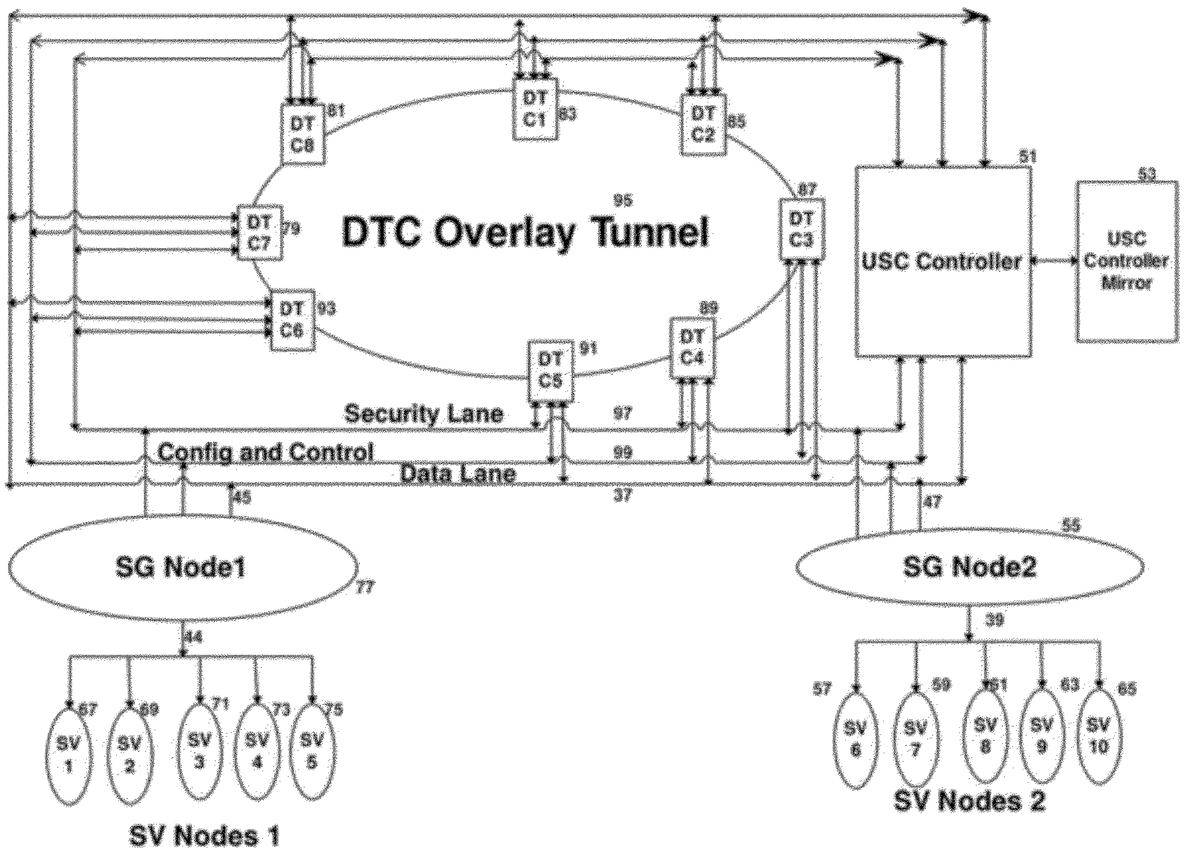
FIG. 1 is a block diagram illustrating an exemplary embodiment with two set of Secure Vaults attached to two different SG nodes, Content Forward Router overlay network and USC controller.

The foregoing description has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The process features or functions of the present disclosure can be implemented by a computing device. As an example, computing device may include enterprise servers, application servers, workstations, personal computers, network computers, network appliances, personal digital assistants, set-top boxes, and personal communication devices.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended. For example, as an aid to understanding, the detail description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to the present disclosure containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the above detailed description.

In one embodiment, aspects of the present disclosure can be applied to an overlay cloud services or any system having data or metadata assets needing real time data risk mitigation from various attacks. Such systems include single, standalone systems running applications, SMTP based E-mail contents, data base applications like MySQL, ORACLE, MongoDB, Cassandra or any SQL or NoSQL like data stores. The aspects of the present disclosure can be extended to modern IT platforms like cloud-native applications running on Kubernetes based IT stack, Open Stack or any Inter-site data transport or migration systems. The central component of the aspects of the present disclosure is the Data Transport Controller overlay tunnel and Micro-segmented data vaults connected to Storage gateway Node, operating in lockstep with the commands and controls from Universal Security Controller. Invention can be applied to FTP data traffic or SMTP data traffic to secure file transfer and mail transfer content from various forms of cyber-attacks.

Significance of the Invention

Invention is acutely significant as quantum computing is a threat to encryption technologies and industry needs data-centric security readiness beyond encryption. Computational security systems can be broken by enough compute power which is possible once quantum computing is a reality in the next 5-10 years. Though lattice cryptography is the new encryption solution that resists quantum computing, it is not available as part of existing VPN and SSL systems and Storage systems for prime use. Furthermore, encryption systems always must manage crypto keys which are often cumbersome for long term data protection. In addition, the invention offers information theoretic security that does away with all forms of encryption key management as information theory is un-breakable to computing attacks. Industry has produced many intrusions detection and prevention systems to networks, but no real products for intrusion and mitigation at storage level. This invention offers new way of intrusion detection and mitigation for storage at-rest and intrusion avoidance for the data in-motion, using information theory. In addition, storage and system activity telemetry enabling security controls, micro-segmented secure vaulting and Exclusive-Path content routing across the borders of various countries and Network Service providers. Invention provides a system, architecture and methods to realize end to end, content level intrusion mitigation against ransomware attacks, system intrusion, storage intrusion and crypto breaks for data at-rest and data in-motion.

Some technical terms of the present disclosure are described below.

Data Transport Controller (referred also as DTG node or CFR node) overlay tunnel: This is the core component of the Architecture. Data transport Controllers is also referred as Data Transport Gateways (DTC node) or Content Forwarding Routers (CFR node), interchangeably in the disclosure and are placed at various locations in the wide area network or internet, running in physical or virtual machines, that moves the data payload to next CFR node or Initiating or Terminating the content journey in the WAN, moving the content through a pre-meditated secure paths across various DTC nodes. DTCs constantly sync various security data and inter DTC state data graph with USC. State data graph is a graph data structure, based on standard graph data structure, representing the available DTC in the overlay network of DTC. A plurality of DTC Nodes make up a DTC overlay tunnel or function as a Secure Storage Routing overlay network.

Universal Security Controller Node (USC Node): This is the Security Control Center part of the core invention and may also referred as USC that has various modules integrated for metadata, security contexts, and system and storage activity telemetry data captured from different systems. USC is also referred as System controller or Security Controller interchangeably in the specifications.

Storage Gateway Nodes (SG Nodes): This is the static end of the core invention, connecting other parts to storage at-rest. Physical or virtual systems having the ability to deliver data in either direction typically backed by a file system or cloud provider APIs or can be a gateway or proxy service to other forms of any standard storage systems.

Security and system agents: These are systems having programmed instructions to send various security activity or system activity or storage activity related data to USC to enable USC to make the right responsive reactions based on the configured security and data safety policies. These modules are placed at Secure Vault Nodes, Storage Gateway Nodes and DTC Nodes.

Data protection agents or gateways: These systems are deployed at various locations needing data protection services delivered as part of active responses to various cyber or insider attacks. Data protection agents constantly communicate to USC. USC trigger Context Risk Mitigation operations leveraging Data protection gateways.

USC agent module: This is a module that is installed in DTC Node, SG Node and SV Node which has system programs that can navigate file systems, look up file changes, compare file modifications against normal changes or abnormal changes such as ransomware activity and also examine system activity such as any abnormal spike in number of processes running indicating a Denial-of-Service Attack. This module can also send system or security specific data or metadata to USC.

Ransomware attack signatures: Ransomware attack pattern is a list of matching storage activity change rules. It can be as simple as a rule that flags the storage activity as a ransomware attack if most of the files in a directory or list of directories are changed in the last 30 minutes This denotes the tell-tale signs of ransomware attacks into the systems. Ransomware can encrypt a file, cause full file change, remove the contents, make drastic configuration changes, rename files, changes of the original file name so on and so forth. Ransomware can do data exfiltration which translates to huge data transfer across network. Infection signatures can be used to detect any ransomware attack pattern. There are various methods of detecting ransomware attack signature, like, rate of change of data activity from normal IO activity profile stored in the USC, rate of change of a file from its normal rate of change, rate of change of different files in a directory and overall file change entropy. Security agents keep on sending various storage activity data to USC, for anomaly detection. USC also make use of storage honey spot files that any ransomware will treat as target customer data, which will immediately indicate as a storage intrusion to USC. Such honeypot files can be deployed at any system, DTC nodes, on protected hosts, data protection gateways, secure vaults or at SG Node modules or at any connected system having critical or sensitive file data stores needing protection from various malware attacks. SC will then initiate various active response actions to data protection agents or to data vaults hosting actual user data. USC will disable the update phase of existing gold copy of data if there is a malware or ransomware activity detected. Disclosure defines this as RAMS (Ransomware Attack Mitigation System).

USC keeps learning the storage activity patterns and updates its databases on what changes are to be considered as attack signature by continually applying Machine Learning rules against what a Security Administrator flags as normal data change or not.

Data Vault: When data is stored in any public cloud storage based on some form of object storage, it is referred as data vaults. Data Vaults run in generalized manner and have open ports for receiving connections. This option is chosen according to the specific requirements of the embodiments and is also referred as Data Containers.

Secure Vault Nodes (SV Nodes): This is the enabling component to implement security at-rest part of the specification. It is very common to store file level data in file systems or in object storage systems for scalability. Typical object server has an IP and a port running the API server which is accessible from any network service. Further aspects of the Secure Vault and its operation follows next Security Parameters, Configuration Parameters and Control Commands: SG node, keep running various commands looking for abnormal observations. Example include a sudden surge of failed SSH login attempts, sudden surge in number of processes, abnormal file changes and so on and so forth. This information is collected and sent to USC controller. USC controller then processes it and looks for any rule match and send descriptors of instructions to be executed at SG node. These response data is referred as control commands. Configuration parameters include the data for proper operation of USC. And can also include the mode of operation of various components as a standard practice of any IT based operations systems.

Data input operation and Data output operation: This term refers to any method through which a user can upload content or user data to or download content from an exemplary embodiment. This can include an FTP based operation or can include a file copy operation to an SG node or from SG node. Data input operation corresponds to the data arrival and Data output corresponds to data retrieval by an end user, such as during a data transfer process.

Figure 13:
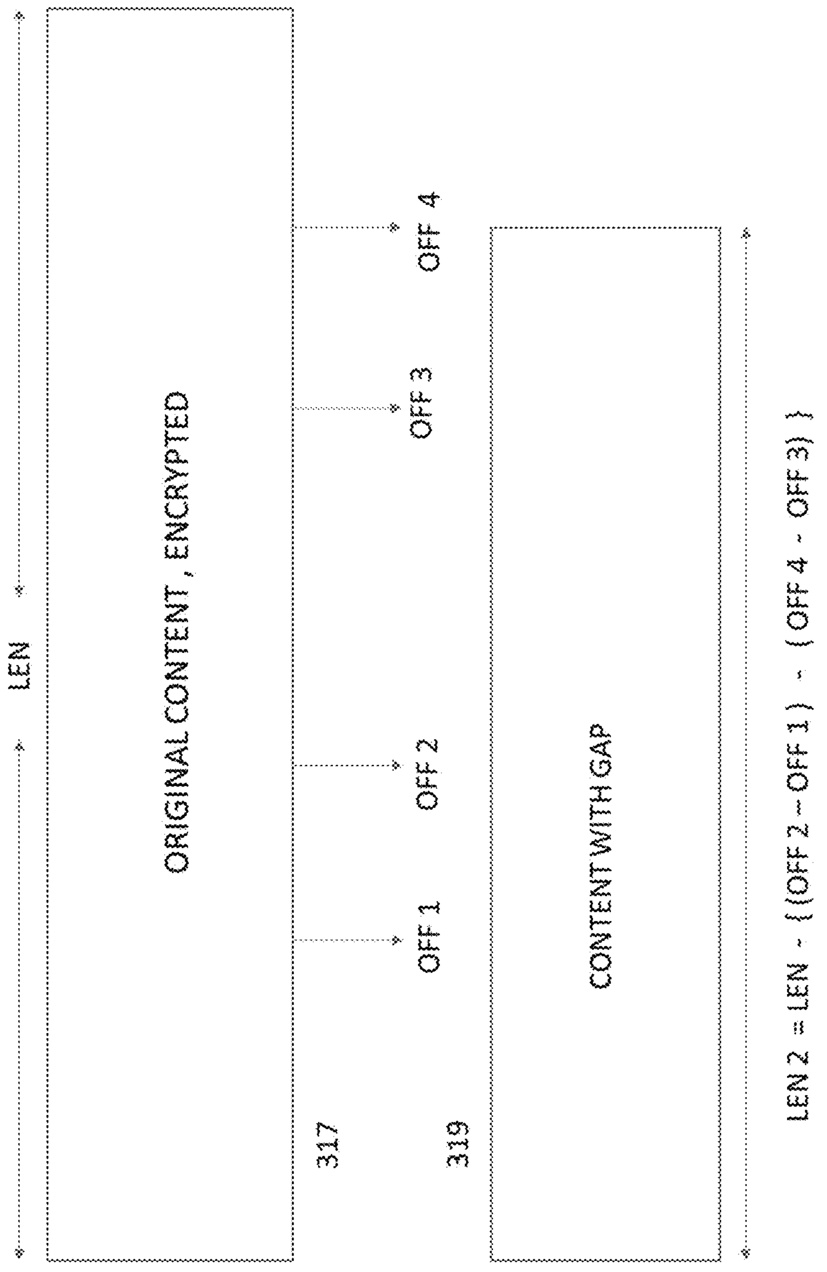
FIG. 13 showing the aspects of data redactions aspect of content fragmentation.

SP fragments (or also referred as fragments): Invention make use reed Solomon erasure coding to split the content into different unintelligible partitions. If data is dispersed after encryption, with encryption keys stored in the content itself, each fragment of the content after the split is cryptographically unintelligible. In reed Solomon, a wide combination of N:M is possible, where if a content is split into N pieces, only M pieces needed for fully recovery and any combination of pieces up to M−1 reveals no information. Invention uses this mathematics in sending only M pieces of the content in M distinct list of DTC controllers in the overlay. Additionally, before erasure coding, content can be redacted with blocks of data removed as gap blocks. Gap blocks, as it is also portions of encrypted content, cannot be recovered unless inserted back to the original content. Referring to FIG. 13, 317 is an encrypted content in an exemplary embodiment. 319 is the redacted block with data removed from byte level data offsets OFF1 to OFF2 and then OFF3 to OFF4. This redacted data content can be erasure coded and upon final reception at the last DTC, gap block data and gap block metadata information, indicating where the gap offsets are, can be used in re-creating the original content and then decrypt the content using the key contained in the content itself. As this gap blocks and gap block metadata can also be separately sent, even without carrying through DTC nodes, invention provide sufficient mechanisms of wire-tapping avoidance of data in-transit. Reed Solomon, as it is information theory-based data anonymization, cannot be cracked by a quantum computer if one portion is available. In an embodiment, regular data anonymization techniques of various ways can be used instead of RS coding or in combination with RS coding. Even different forms of erasure coding can be used as appropriate. Invention defines these fragmented portions of the content defines as SP fragments. SP stands for Secret Partition. Recreation of the original content is the reverse process of RS coding to create the original data, then apply the gap block meta data to insert the gap blocks as per the gap block metadata, and then the decryption. Disclosure defines this process as the Content Reassembly or CR operations.

Binary Verification or BV operations: Any system can be tampered, and any binary can be replaced by a malicious adversary. DTC node, SG node has executable instructions that keep calculating the SHA signature of the known binaries compared against the trusted binary signature as stored in the USC controller or any trusted source as implemented in the embodiment in question.

EP forwarding or Exclusive-Path forwarding: This is the crux of DTC operation. Once SP fragments are created at SG node or at the first DTC node as applicable in accordance with the embodiment, every DTC node is to look up the next hop listed in the Content Forwarding Router List (CFR List) created at the first DTC. Every different fragment of content is called a fragment set. Only the minimal set of fragments to be needed for full recovery is transferred which is called a minimal fragment set. Each member of the minimal fragment set receives a unique set of path lists, embedded in the fragment, and transmitted by the first DTC. Then every next DTC, simply lookup the list, and updates the next DTC node information as the next hop and send the fragment to the next DTC and this process repeats until the fragment reaches the last DTC node. As each fragment goes through exclusive list of paths, this process is called Exclusive Path forward. (EP Forwarding). This can also be used for multi-path forwarding in some contexts. First DTC originates the forwarding by picking the exclusive list of DTC nodes through which the CP fragments have to be forwarded through. Last DTC in the list does the termination and CR operations.

Common Methods Used: As for securing data at rest, from ransomware attacks, USC again make use of data dispersal technologies to store it in multiple, isolated segments of storage vaults, to avoid single point of intrusion-attacks. Each segment in itself reveals no information to an attacker. Invention refers to this as micro-segmented data vaulting. While there will be at least 3 or more fragments that are stored in separate vaults, only a subset of those fragments is needed for actual recovery and any single portion reveals no data, even with a quantum computer based attack. USC controller periodically instructs security agents to create storage “honey-pots” to attract ransomware to act upon. Storage honeypots are simply some data specifically stored at protected systems to see if it is changed in some manner, to signal the ransomware entry as it cannot distinguish those files from regular customer data. These storage honeypots can be any normal looking files, with specials file names and folders that cannot be detected by ransomware. These files will be stored in a layer of unique directories with unique file names. And SG node keeps tracks of any file modifications to it and will in real time inform USC. USC will immediately begin Active response services by instructing security agents not to perform data updates on the backup systems. USC will further isolate the system by removing all network connections to it and send critical alerts to data protection administrators configured as human contacts upon any anomaly detection. USC will then instruct the security agents to shut down the system if configured so, to further isolate the system from infecting more connected systems. Security agents are also capable of detecting ransomware attack signatures by profiling the storage activity. As USC has a component of versioned and immutable data backups stored in logically isolated from networks, new ransomware attacks will never affect existing data stored protected. Every new data object or modifications of new data will create a new version of the object. Number of versions can be configured by a user with configurable parameters stored in an xml file. File versions can be made incremental or whole file versions. Incremental versioning makes use of change journaling records. Every change is written into a change tracking file with corresponding metadata of version numbers and corresponding change tied to it stored separately. When a user requests a particular version, metadata is looked up, extract the base version, and apply the change journal to recreate the content sought. When a new object version is created, its version numbers are updated in an XML file with its time of creation and date stamp and accounting information such as system user who performed the operation and total storage consumed for previous versions and related data, which are referred as version parameters.

Like Data protection gateways offering real time remote data protection services at the request from USC, DTC nodes are deployed at different parts of the WAN driving the fragment routing across the overlay network when data transfer for storage migration is needed from 1 segment of the vault or multiple vaults to another 1 segment or another set of the vaults located in another country or over long distance. In at least one embodiment, data from one SG node will be routed to another SG node located in another country through many intermediate countries. Always effort is made to route the application data across different set of intermediate countries, using exclusive list of DTC nodes to be forwarded through for the best possible routes without shared list of DTC in the same country and to avoid wire-trapping across borders from a particular nation state funded cyber-attack situation.

USC controller also makes use of data protection agents in addition to security agents deployed at every system. Security agents collect all system activity summary like amount of memory available, number of processes that are running, no of failed login attempts over an SSH connection, list of new binaries installed, list of ports open and similar system information which are collectively termed as intrusion indication parameters. Similarly, storage activity data include various directories and file change and sent to USC over a WAN connection or through a local LAN connection. USC receives all telemetry data and feeds it into Log Analyzer, which is a tool that can parse and analyze log data and process the data received against configured data security policies and trigger various commands stored in the USC to instruct the protected systems for appropriate actions. These commands include the system command to initiate a bulk data transfer across the overlay to another set of SV nodes attached to another SG node. This command can be as simple as shutdown some services in affected systems. Any security operator can configure the desired state of the affected systems through a GUI. Command can also include the invocation of a data lock-down, disallowing any user to access any more data. Invention defines this as contextual data protection operations. If security agents detect a ransomware activity, USC can then send an active response back to protected system, instructing the data protection agents not to update the existing data backups with new updates, as it could potentially corrupt the known gold copy. As configured data protection operations can be triggered by USC, based upon the context of systems under surveillance, security risks can be mitigated in real time, during an attack event.

In one exemplary embodiment, detailed data and control flow of the invention is explained below. Setup and Architecture of the embodiment is explained first SG Nodes are connected to USC over any form to TCP/IP based WAN. SG Nodes are connected to at least one of the DTC Nodes that terminate TCP connection or any transport protocol end point such as SCTP, MP-TCP, UDP or DCCP. DTC node has five parts, namely originator, distributor, terminator, Tx and Rx. Fragment will hit one of the first DTC Node, as part of the overlay network of N*N−1 connected mesh network, originator module will create the header and insert it to the content, re-create the file and push to the forwarding queue. Tx module will send the fragment to the next DTC Node. Rx component of the DTC Node will receive the new fragment forwarded to it, and hand over to the Distributor component which will update forwarding header containing the source path routing list of different DTC Node if forwarding to upstream DTC node is needed. This process will repeat until it reaches the last DTC Node in the overlay network. Terminator component of the DTC Node will then pick up the fragment and handover the SG Node attached to the DTC Node. SG Node will then move the fragment to one of many SV Nodes as its final storage at-rest. Every DTC Node in the systems contacts USC and receives updated Node state information when an existing DTC goes down or a new one is added to the system. Originator module will then redraw the source to destination graph for every destination DST Nodes connected to it and re-calculate 3 or 5 or 7 distinct paths for the different fragments of the customer data files or data objects or data blocks to be routed by. All route updates, Node state graph updates are done CP (Control Plane) Module. CP module and Security Agents can be integrated as a single module or can be implemented as two separate modules.

Secure vault provides secure network isolation capability to traditional object storage. Secure vault stores data in the form of immutable objects while the system including the objects does not listen via an IP or a port. Secure vault connects SG Node module taking the role as a secure data proxy, using an ephemeral IP and port, gets authenticated through open SSL channel or direct TCP, and initiates a TCP connection. The data proxy performs the role of synchronization of all data without needing a connection initiation to the secure vault. Once TCP connection is established, TCP client takes the role as a server and flow of TCP stream is reversed. Invention defines this as Reverse TCP flow method. Hence, only trusted service running in SG Node module, can exchange data with secure vault through the mechanism of reverse TCP flow, preventing ransomware attack or any form of network intrusion on secure vault. The SG Node modules and secure vault systems are continually monitored through USC. In some embodiments, data containers can be hybrid-cloud storage services or purely public cloud services. Secure Vault or data containers can be built out of a mix of on-premises vaults and cloud services, forming a hybrid-cloud based secure data vault which is connected to SG Node and USC node Referring to FIG. 1, representing an exemplary embodiment of the invention, 55 and 77 are two SG nodes. 67,69,71,73 and 75 are the SV nodes attached to SG node1 (labeled as 77). All these SV nodes can be stored in different locations and need no static IP to operate, unlike an object server. 57, 59, 61, 63 and 65 are the SV nodes attached to SG node2, 55. 51 is the USC controller and 53 is its replica for redundancy reasons. 79,81,83,85,87,89,91 and 93 are the 8 DTC controllers are operating in the DTC overlay. 37 is the separate data lanes for moving user content, 97 dedicated for carrying security control data and 99 is used to move configuration and control data.

In one embodiment, when USC controller is configured to operate as a security control point, it will monitor all systems having data resources, for any anomalies, corrupted files, malicious activities, virus activity checking and configuration changes. File hardening and related security monitoring services can be performed as a separate security management feature. All components in the SG Node can get a gold copy of configuration files, security configuration files for OS attributes, management data such as various services enabled for each SG Node module and hence various identity verification services can be performed. In any standard system, security and management configuration data can be set by a graphical user interface or through a command line interface at the USC node. USC node then distributes security and management data to SG Nodes and SV nodes. USC constantly monitors every storage input and output activity occurring in SG Node modules and in some embodiments, SV nodes as well by exchanging every system activity logs, storage activity audits to USC, which is subsequently analyzed by a standard log analysis tools at USC. A security administrator can configure various policies and can instruct the USC to remotely shut down the systems having the data stored in SV nodes or SG Node. By default, USC initiate such operations against configured intrusion events such as anomalies in the configuration changes, ransomware activities or different forms of system intrusion.

USC performs monitoring in real time ransomware attack signature. Hence, ransomware attack is detected as part of a new backup epoch update or through pro-active monitoring process. When every new data fails to match the ransomware attack signatures, it will meet the data qualification. Data qualification parameters, indicating ransomware attack signature explained earlier, can be set as frequency of data changes and amount of data changes.

When user data is fragmented according to information theory based on erasure coding combining compression, encryption and deduplication, data is further optimized at compression level and deduplication level. As noted earlier, since secure vault is not listening via any IP or port, network worms such as ransomware cannot penetrate systems hosting SV node.

As known gold copy of actual protected storage is always stored in mathematical pieces through information theoretical dispersal technologies across secure data vaults, stored in logically air-gapped manner with network isolation explained earlier in the disclosure, no ransomware or cyber-attacks can be successful as in any worst-case scenario of SV node was accessed, single vault reveals no information. If any data vault is compromised data still cannot be modified as it is stored in immutable manner with multiple versions. Any new update simply creates a new version Secure Vault also has integrated security agents monitoring system and storage activity and periodically synchronizes the security and system surveillance data with USC. USC then stores the data in its database to improve the machine learning aspects of what normal behavior is and what is not.

All communications across various components like SG node, SV nodes, DTC and USC controller use separate channels for data traffic, security data traffic and control and configuration channel, to avoid a single point of data breach situation of the inter-component communication of the invention. As data is routed across exclusive list of paths in the DTC overlay network, in the worst case of an unlikely intrusion, security data channel on a separate channel will increase the odds of attack avoidance. Similarly, the separate channel when configuration and control commands are transferred. A channel can be separate lists of DTC controllers, that the traffic forwarded through or can be a separate connection across a different provider network or any other form of increasing the probability of moving data across two end points through distinct set of network intermediaries.

Figure 10:
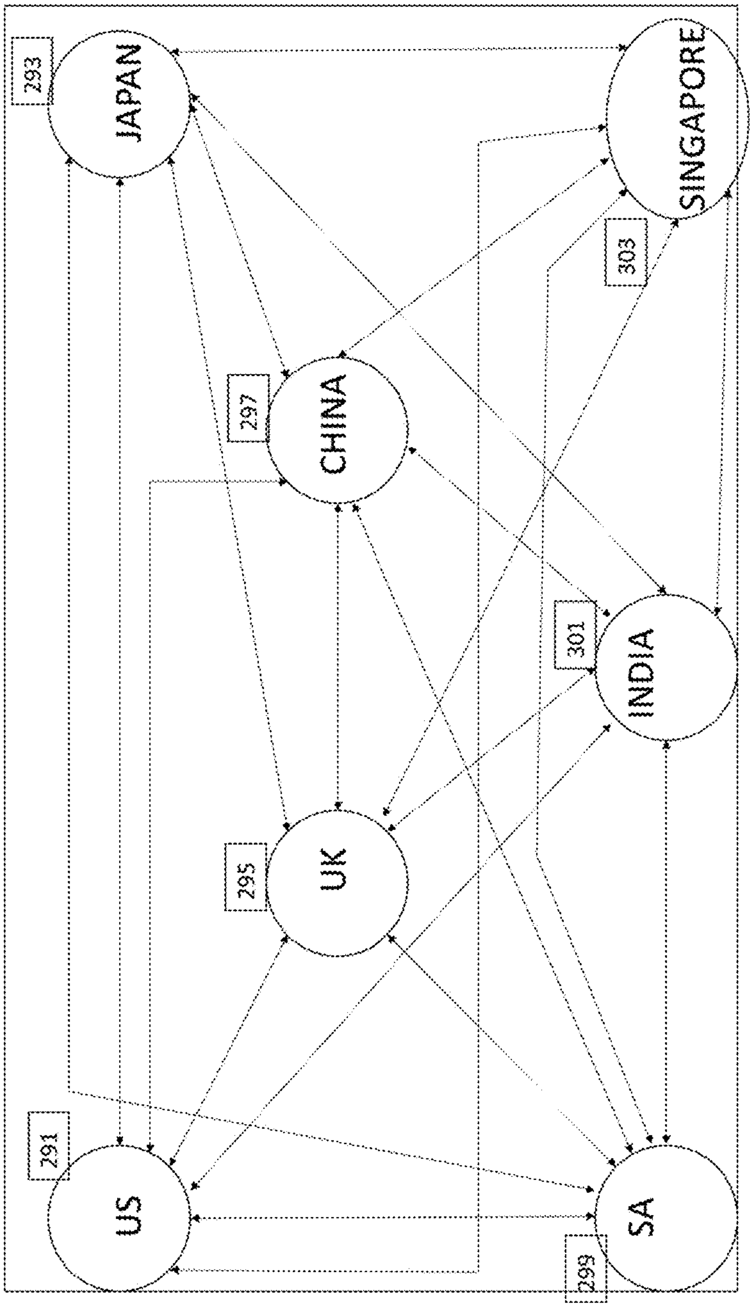
FIGS. 10 and 12 shows the DTC overlay without SG nodes or USC controller as in an embodiment.
Figure 11:
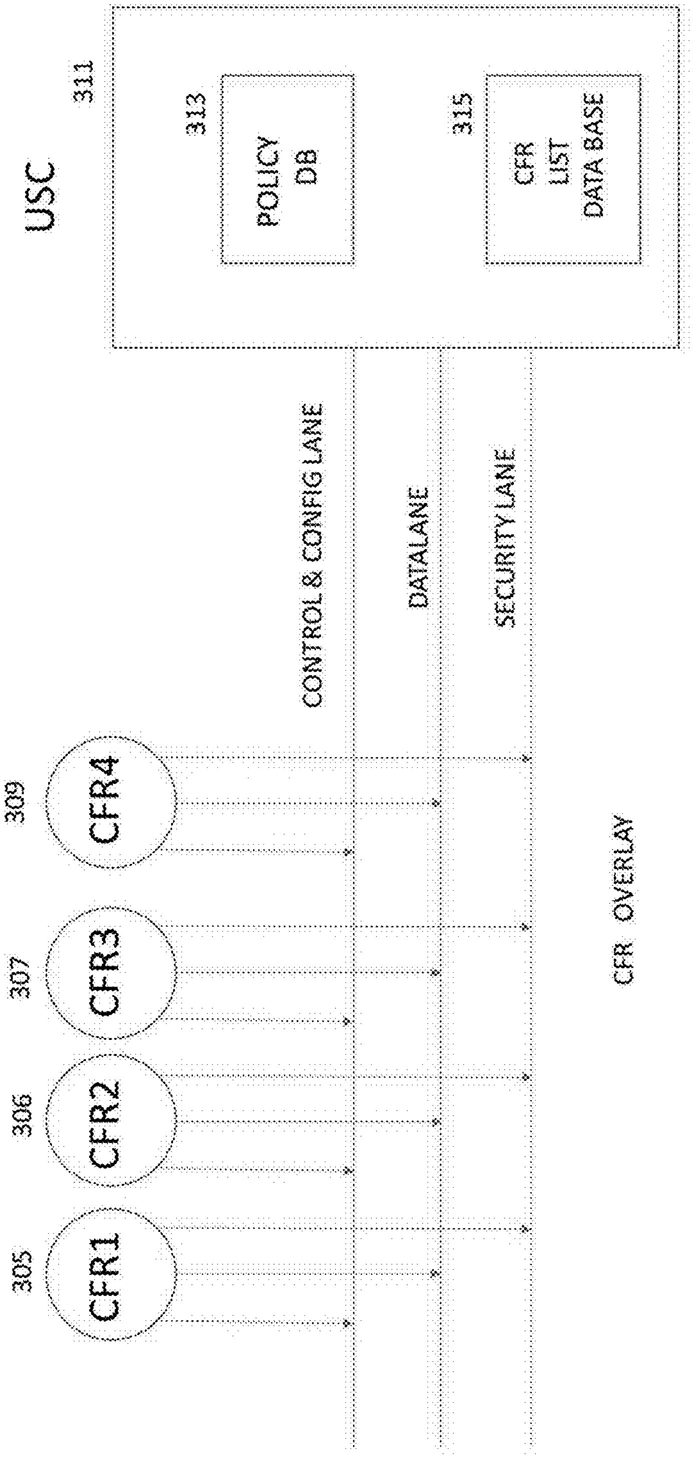
FIG. 11 is a block diagram illustrating the theory of operation of data flow between secure vaults and DTC controllers under the security control operations of USC, indicating separate channels for data transfer, security control and control or configuration exchange.

As security attacks in multiple forms, a single dimensional security protection will not secure storage systems. It must be multi-dimensional, and in multiple layers. Security attacks can come from a ransomware can come from a malicious insider, can come from a Man in the middle attack. USC (Universal Security Controller) has agents installed in various systems holding valuable data assets. Every host, having agents installed, constantly communicate to USC transferring various security control and system activity data. USC controller has a policy and telemetry data base, taking various events to be considered against as attack scenarios. USC will send commands to storage agents to get sensitive and critical data assets to be transferred to other systems stored at isolated locations, with partial data in encoded in different formats. Once such format can be Reed Solomon encoding. When data is transferred from one system to another system across a WAN connection, data assets are routed across different paths across WAN at content level, as opposed to packet level as in traditional underlay routing. For one embodiment of the present disclosure, a set of Virtual Machines will be hosted in different data centers, in every country with knowledge of country and location information of the systems. This knowledge is stored as a graph in USC. Whenever a data needs to be transmitted from one location to another location in the Wide Area Network, USC can be configured to select a unique path from this graph or can be configured statistically or a combination thereof, for any pair of source and destination locations and will send command to security agent to transmit data, accordingly, including all Nodes to be visited for this path. Security agent, after fragmenting files with various dispersal technologies, data transformation, and leaving content gap blocks, select each fragment and gap blocks if any, and transfer across a unique path. For example, if one Node is stored in a data center in India and another Node in US, some fragments will be moved, at network devices level across Atlantic side of the Globe, visiting an intermediate VM in EU, and other fragments will go through Pacific visiting an intermediate Node through Singapore on the way to US. Referring to FIG. 10; 291,293, 295,297,299,301 and 303 are the DTC nodes hosted in different countries. If a fragment sent from 301 (India) to 303 (SINGAPORE), it will never go through any intermediary located between India (301) and South Africa (299), unless there is a serious router flaps happened because of the way L2/L3 devices work based on the principle of minimal cost-based packet routing to reduce the packet latencies. Invention makes use of this core observation by forcing the content to move through a pre-destined path, at content level with connection termination at every hop. Underlying packet routing systems cannot re-assemble the packet stream from beginning to end. Further, invention make use of separate channels of communication. Referring to FIG. 11; 305,306, 307 and 309 are Content Forwarding Routers (also referred as DTCs) and use separate channels for Control or configuration traffic, Data traffic and Security traffic. Control and configuration Lanes will carry traffic containing data from Policy Database (313) and Security Lane will carry traffic for CFR List Database (315) update process. Regular content traffic will go through data lanes. Different channels or lanes can be provided by different network services providers for example, to further increase the security reliability guarantees to defend against the Man-In-the-Middle (MIM) attack scenarios.

Figure 12:
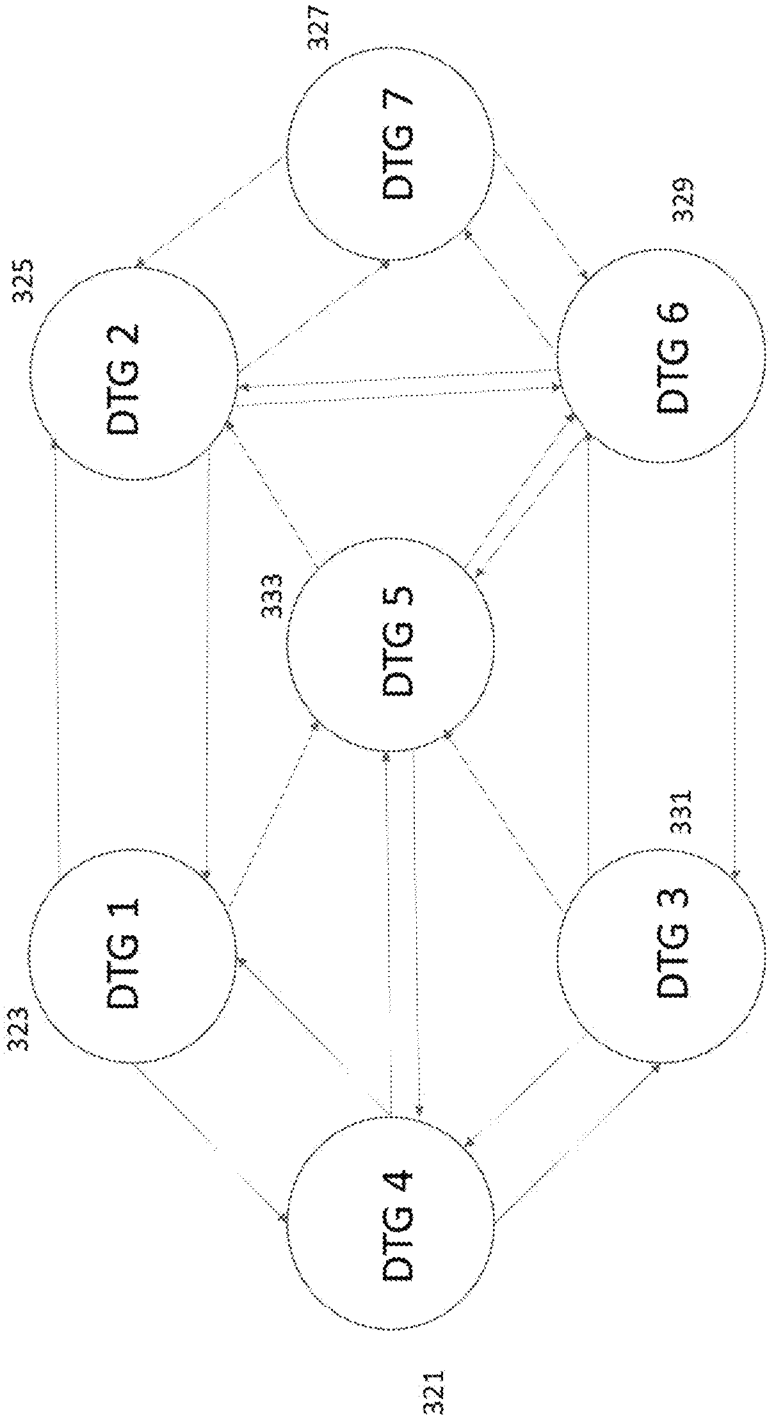

Referring to FIG. 12, an embodiment of a DTC overlay without a USC controller or SG node is shown. In this embodiment, DTC node itself has to get the information about other DTC nodes through a manual data entry operation into DTC system or by other means of DTC info collection process such as a cloud API based micro service running in the cloud relaying the node information about every DTC node. Disclosure defines this process as DTC-info collection operations. Every DTC node has to refresh its node state information periodically. Traditional Neighbor reachability and Link state graph building method of underlay, packet level routing cannot be applied here, as all DTC nodes are not L2/L3 devices but operate at application level and a centralized distribution of DTC node info distribution mechanism has to be deployed, in the absence of USC.

This is akin to overlay data routing, at application layer. All state management, end to end delivery of each fragment is handled by USC-DTC pair and keeps track of transmission status of every fragment from every Node to its immediate destination.

Explaining fragmentation technologies further, a file can be split into any chosen RS number. For the sake of illustration, 5-pieces or 7 Pieces using Reed Solomon erasure coding as in at least one of the embodiments, while RS coding can be extended to higher no of fragments. Additionally, data can be compressed, de-duplicated and encrypted, with encryption keys contained in data itself, before creating SP fragments. Furthermore, at random offsets, some data blocks can be plucked out and create a separate gap blocks content with gap block metadata creating multiple fragments unintelligible in itself, secretly split. Fragments are also referred as SP (Secret Split) fragments in the disclosure. Any single piece of RS fragment reveals no information and when it is paired with encryption, quantum computing cannot break the privacy of the data. As data is already erasure coded, encryption key can be left in the file before the split, and it avoids the problem of Encryption Key management. Upon reception of sub-set of the fragments, as needed by the RS recovery, called minimal split-set of fragments, to the other side of the communication, original content is recovered, encryption key is recovered and decryption can be done safely by the other party, given the proper authentication to receive the data at receiving side. In another embodiment, content gap blocks can also be added in the data stream which is sent in totally different set of DTC in separate paths as independent streams of data.

Access controls, Authentications services can be applied at various end points, based on the technologies available in the market, like SSL, Multi-factor authentications systems, RBAC based systems as appropriate for providing additional, theoretical safety.

USC is connected to SG nodes, SV nodes, and various Data Transport Controllers in at least one of the embodiments of the present disclosure. Security and system agents running in all connected systems. USC also has various metadata for storage security management, security state and system states of various connected parts which is also redundantly stored. When any security or IT risk incident happens, USC engage SG nodes or Data Protection gateways to deliver various Contextual Risk Mitigation (also referred as CRM) Operations such as taking an immediate backup when there is an imminent hardware fault detected, or an immediate storage migration, across DTC nodes, is performed and system is shutdown when there is an insider caught on data exfiltration. Similarly, appropriate response is performed when there is a ransomware attack detected, such as informing all SG nodes not to update the existing backups with updated data, to prevent new data from corrupting old gold copy. Response also includes generating various threat alerts and updating the USC controller with various attack signatures. CRM operations are facilitated by a command policy database. This contextual data protection service is rendered by the USC controller as the response to a typical system or storage intrusion. New content can enter into the first SG node through a user using the embodiment by storing the content through a file folder service offered by SG node or through any form of data upload service. Data output operation is performed when a user needs to retrieve the content from the embodiment.

Figure 2:
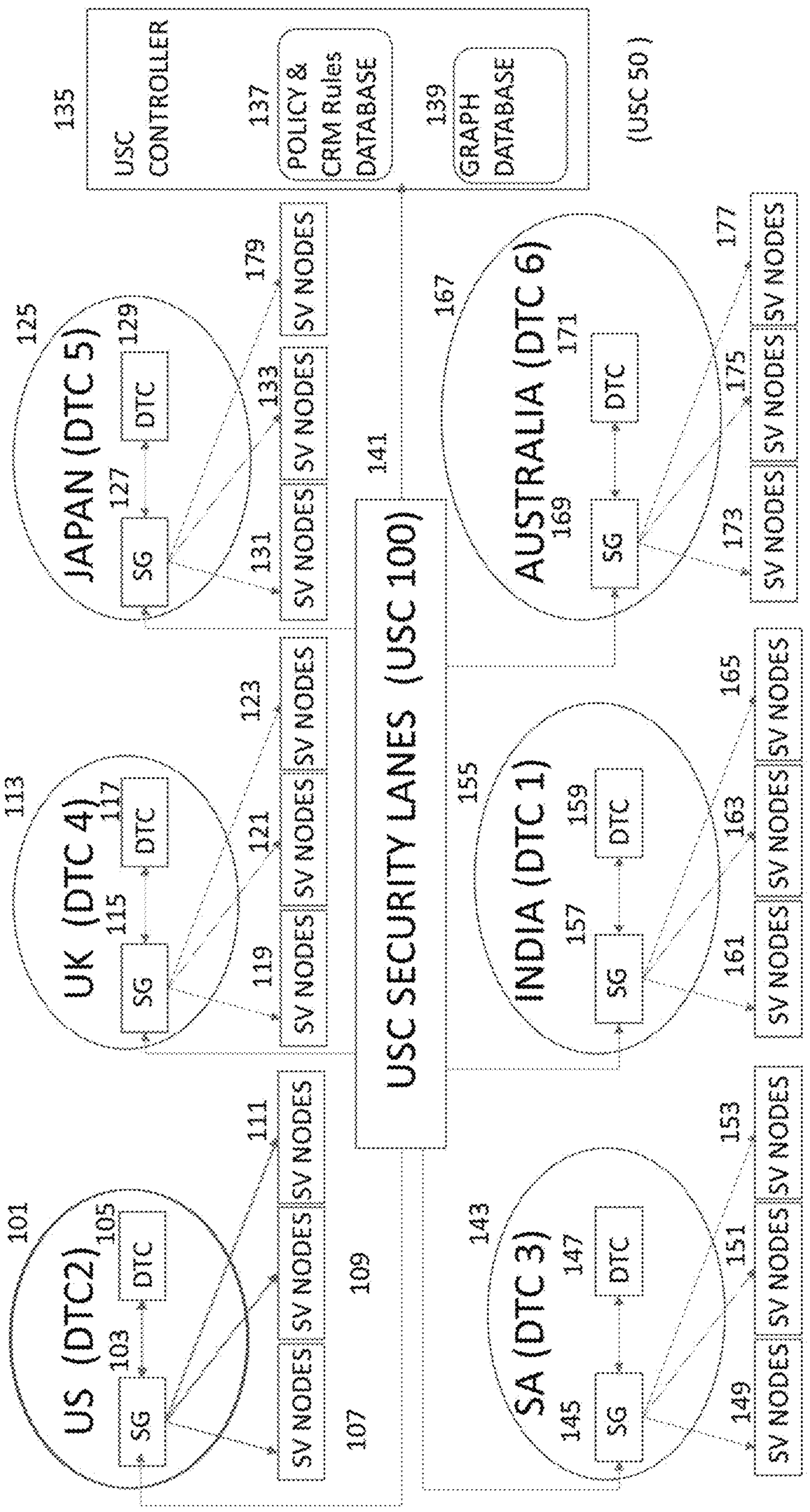
FIG. 2 is a block diagram illustrates various DTC nodes that can be specifically hosted in multiple countries with inter-country data movement control aspects shown.
Figure 3:
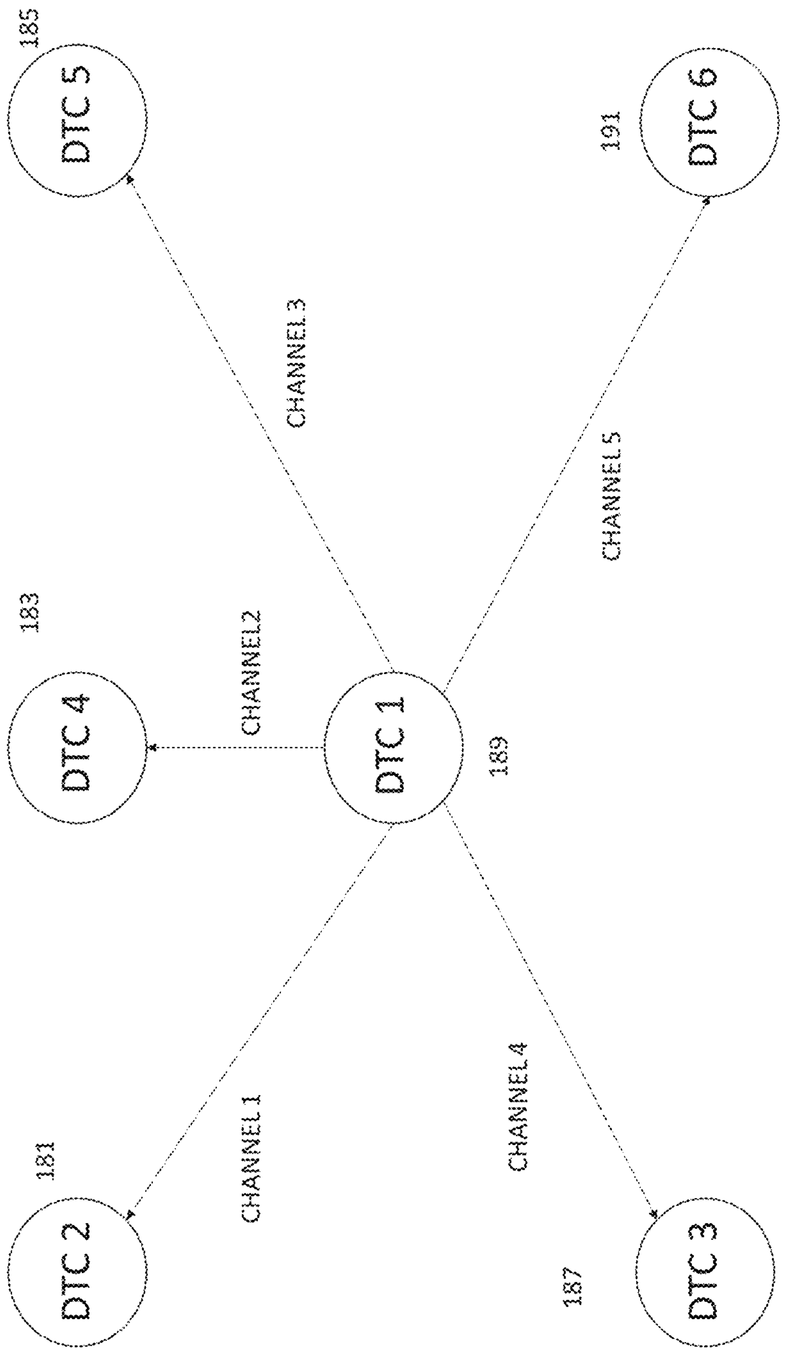
FIG. 3,4,5,6,7,8 show the other connected DTC controllers as each DTC view its connected DTC peers in the overlay, for 6 DTC nodes as an example.
Figure 4:
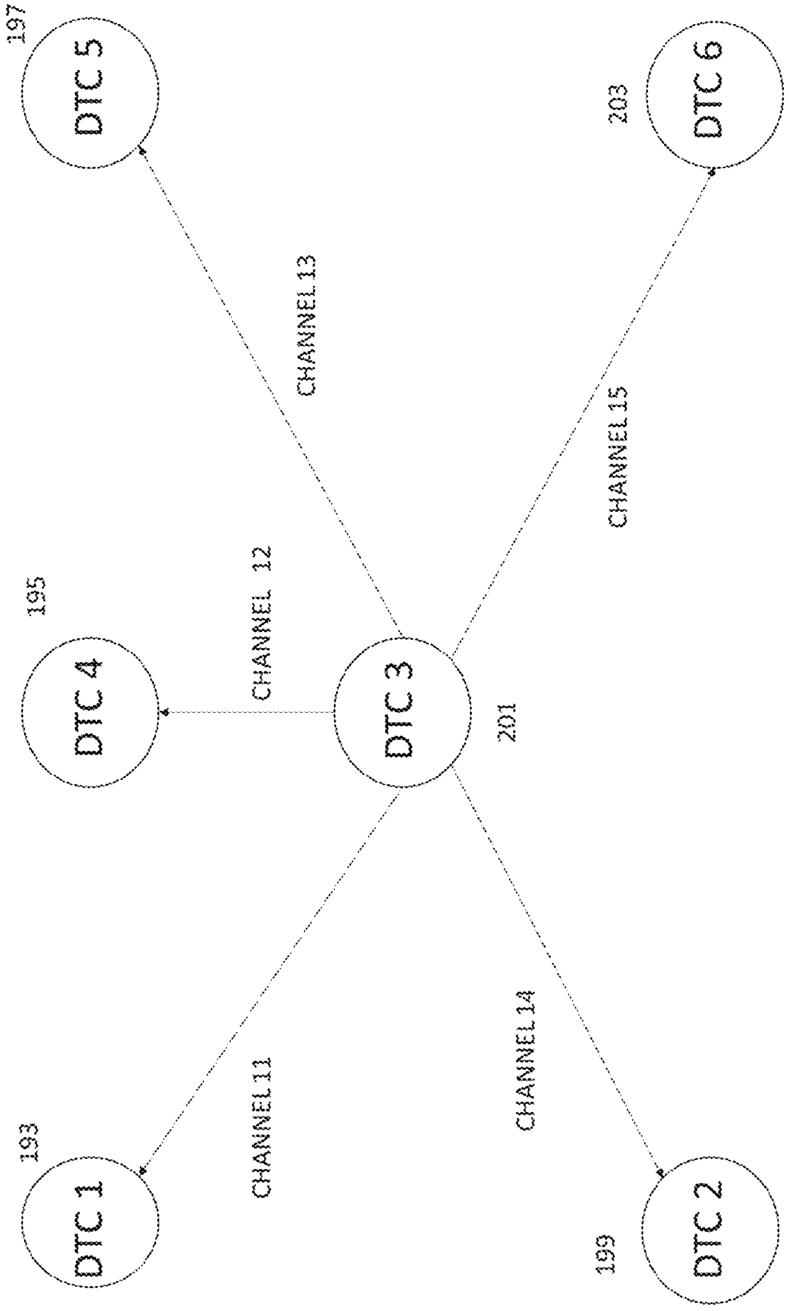
Figure 5:
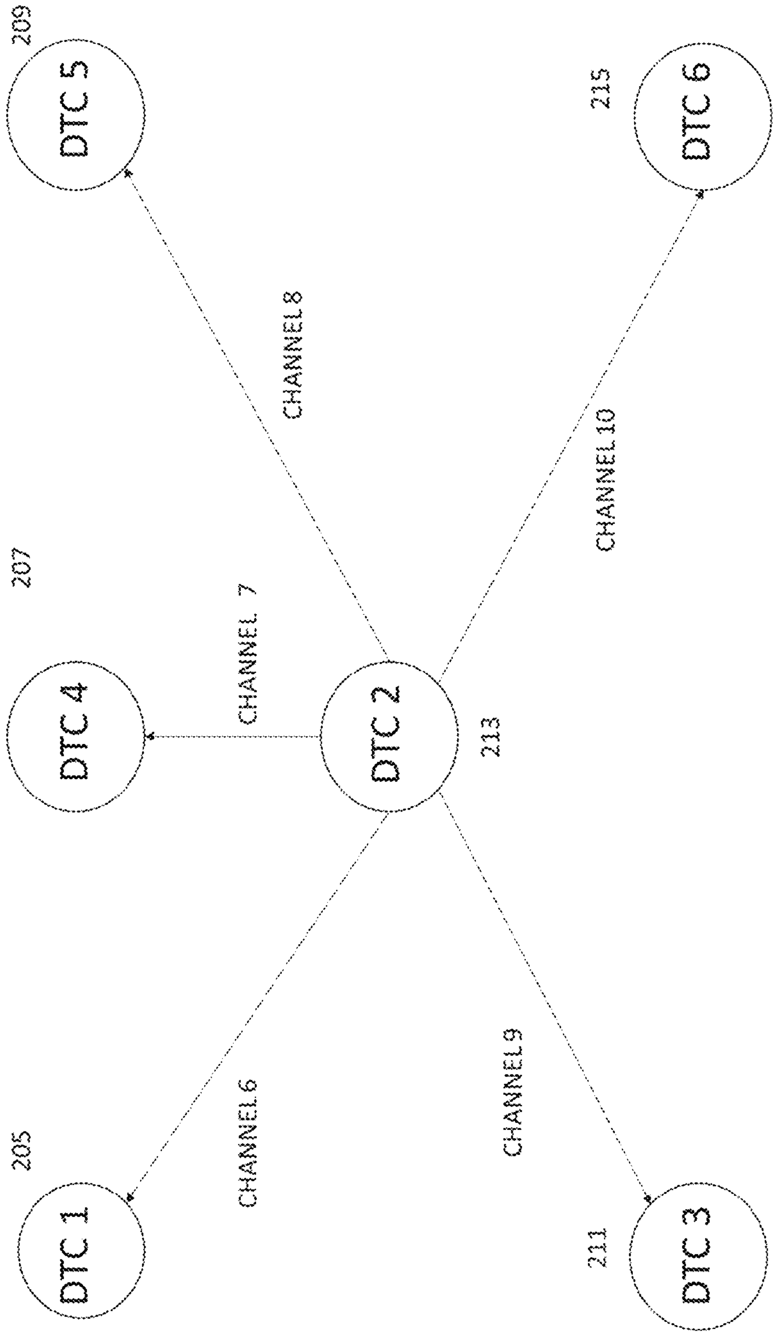
Figure 6:
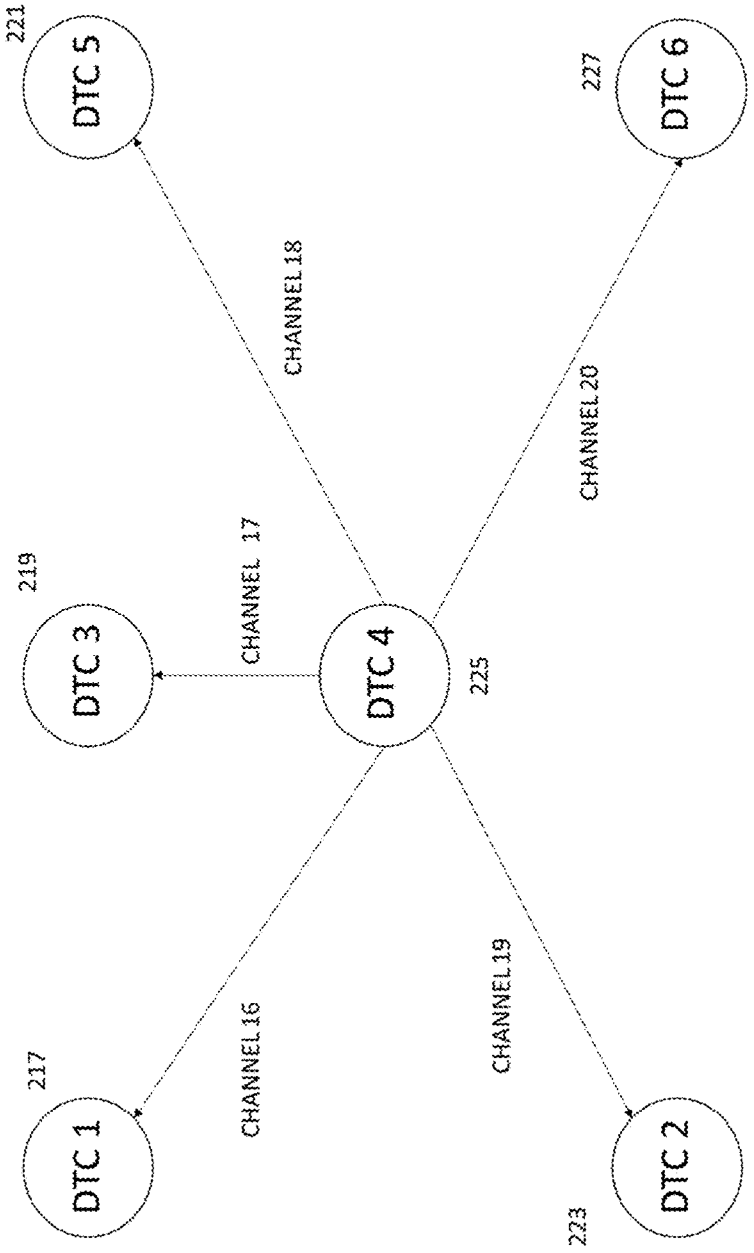
Figure 7:
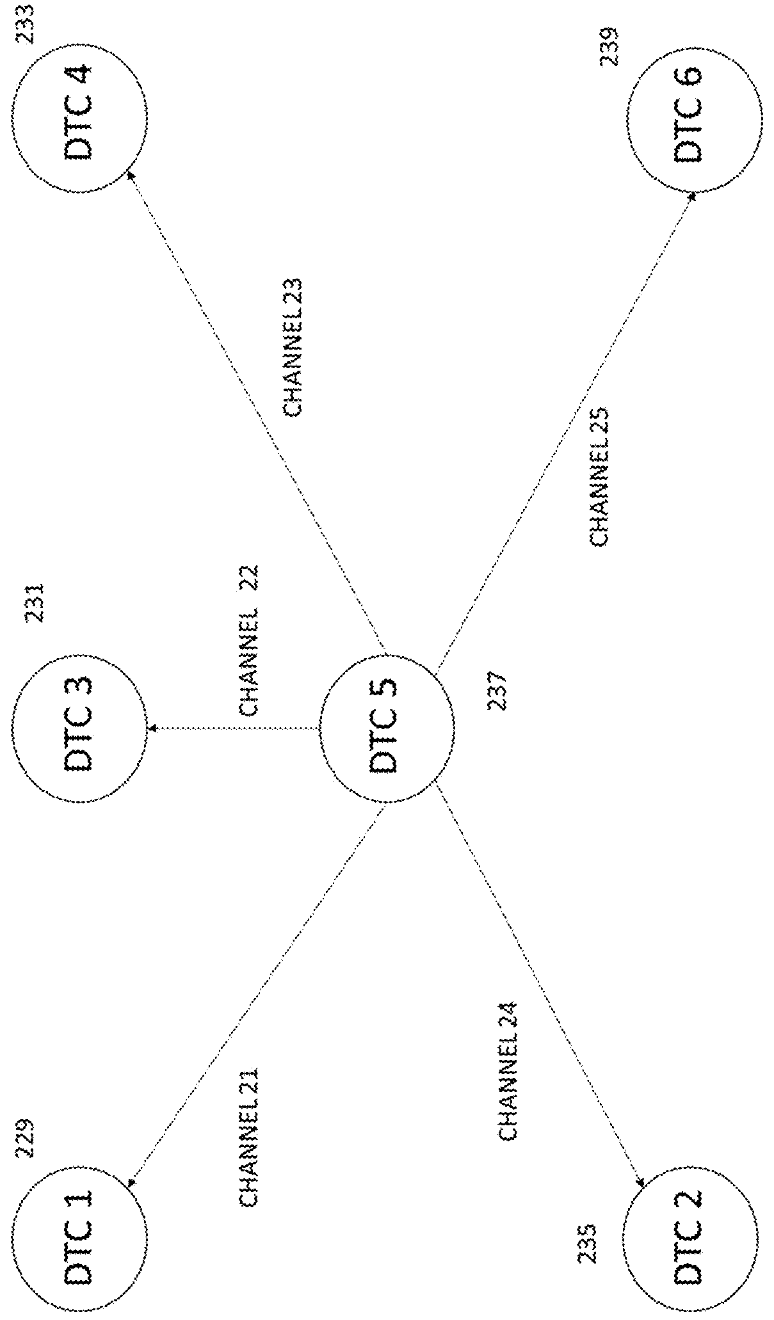
Figure 8:
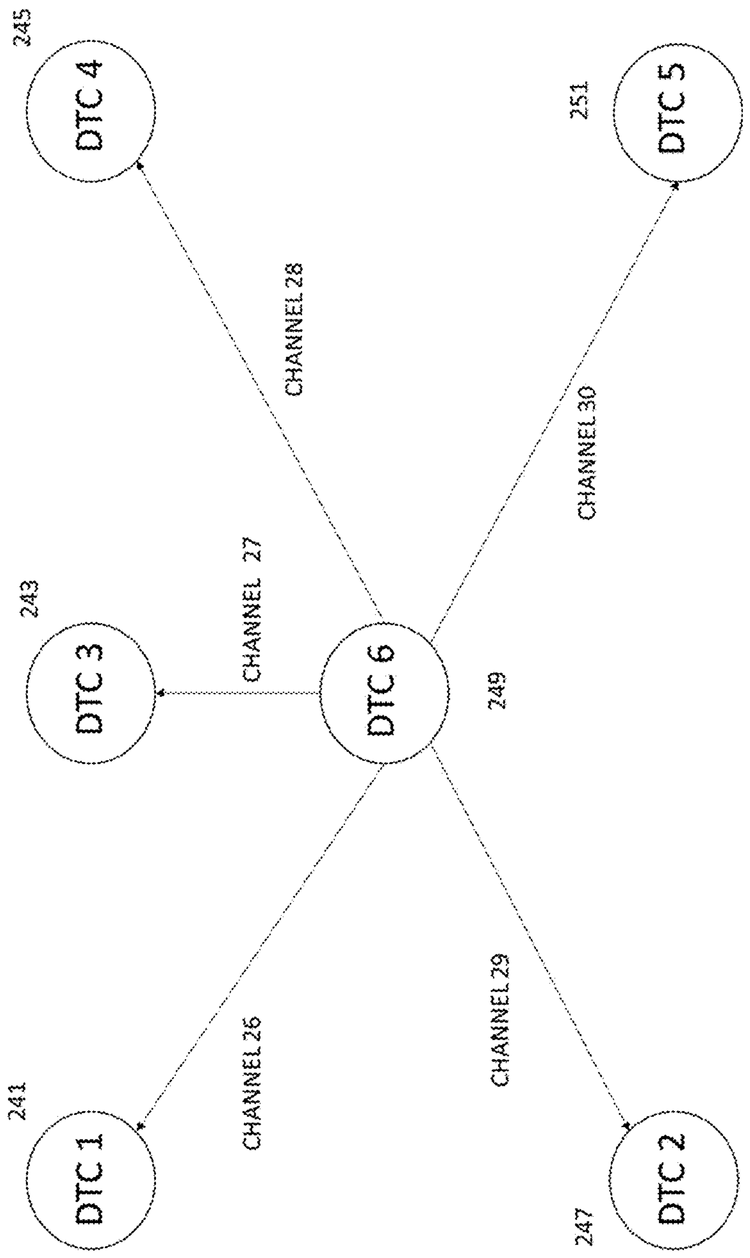
Figure 17:
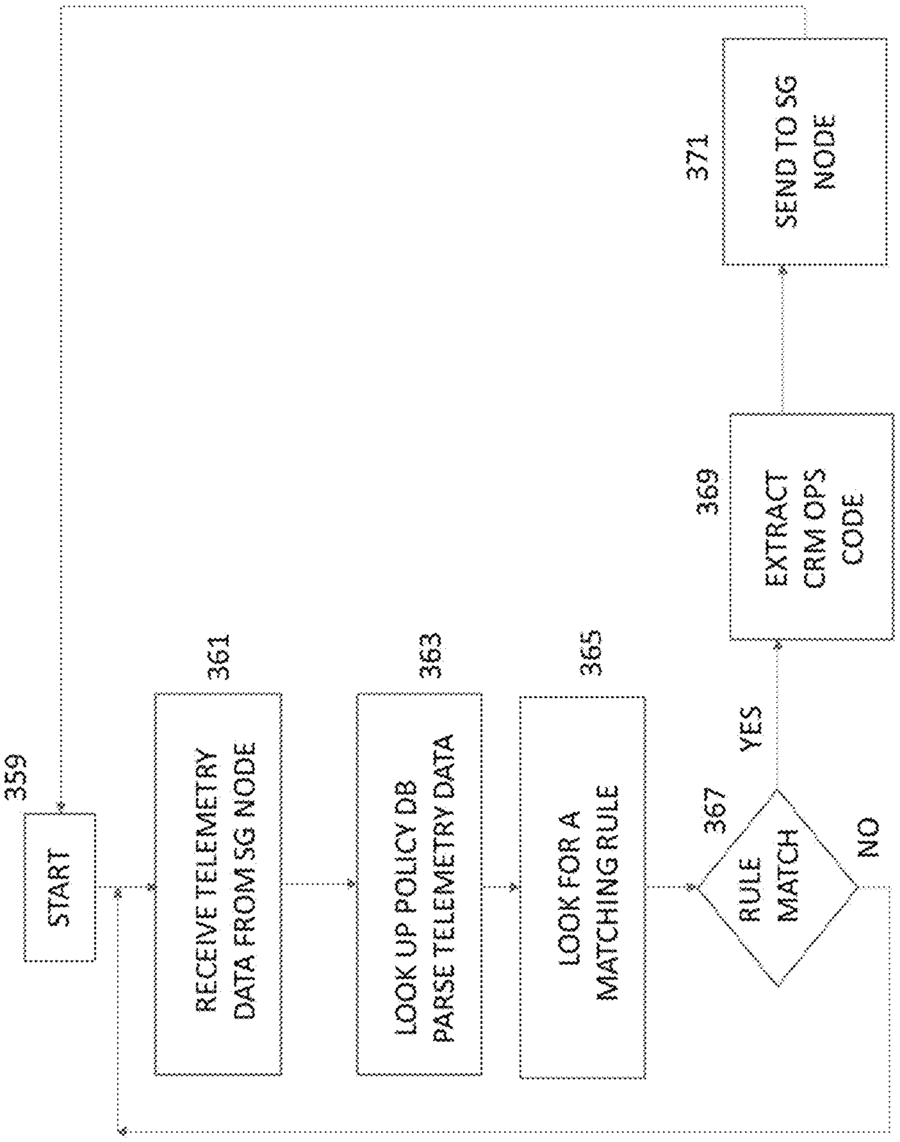
FIG. 17 is a high-level operational logic of a USC controller.

Referring to the FIG. 2, USC 50 (labeled 135) is the USC system, having all telemetry data sent from all DTC Nodes stored and processed. 6 DTC Nodes (labeled in 101,113, 125,143,155 and 167) are shown as in an exemplary embodiment while the number of DTC Nodes can vary from 3 Nodes to a large number spanning throughout the world, hosted in private data centers or in the cloud, whereas each DTC Node can include a local storage gateway or external storage gateway attached over an IP network, with each storage gateway may have Secure Vault Nodes (SV Nodes) attached to it, forming the DTC Overlay Network. Each DTC Node has security modules constantly communicating to USC through USC security lanes (labeled as 141) identified as USC 100. Each DTC, Storage Gateway systems is labeled as SG, and Secure Vault Nodes (SV Nodes) are identified as SV Nodes. For example DTC 2 running in a DC in US (101) has SG node (labeled as 103) has SV nodes labeled as 107,109 and 111. Similarly for other DTCs in the figure. Secure Vault Nodes can also be implemented as a private cloud or in a public cloud. If SV Nodes are implemented as public cloud object storage in an embodiment, secure isolation capabilities and storage immutability features are absent for the embodiment in question if the cloud provider does not support that. USC controller can initiate a data transfer stored at-rest in the SV Nodes to be migrated to another geo location for any reason. The request hits the SG Node, which will in turn get each fragment of the data and send to DTC Node connected closer to it which can be statically configured This first SG Node, originating the data and first DTC Nodes, picks the data in the overlay network is called ingress SG Node and ingress DTC Node respectively. First DTC Node then identifies the destination DTC Node, which can be in another country. First DTC Nodes then pick a unique list of DTC Nodes which are stored in multiple countries and route the traffic to the next in the list, until it hits the last DTC Node which will terminate the data and deliver to the SG Node connected to it. The list of such node information can be represented by standard graph data structure. This is referred as node state graph. Last DTC node and SG node are called Egress DTC Node and Egress SG Node respectively. In some embodiments USC may have direct message exchange path established. In other embodiments, SV Nodes will establish message and data exchange path between SG Nodes, which in turn establish message exchange path to DTC Nodes and USC controller. Message exchanged include the information such as number of processes currently running in SG Node, last access times of certain directories, last modification times of certain files, any access violations or login failures and so on and so forth depending upon the specific aspects and configurations of the environment. These types of data indicate any external intrusions in the system and act as storage intrusion parameters which are transmitted in real time to USC Node, by the USC agent module. Same type of information is sent from every DTC Node as well to the USC Node. USC Node has dedicated commands, instructions to deliver to SG Node or DTC Node to mitigate the intrusion. It can include commands like REMOTE SHUTDOWN, indicating to shut down some services, further isolating the intrusion source, such as ransomware entry point. Disclosure defines this method as SIPS, stands for Storage Intrusion Prevention System or as SIMS (Storage Intrusion Mitigation System). The remote command exchanged by the USC includes a real time storage migration from an SG Node to another SG Node, across the DTC overlay network. During such migration, DTC move each fragment in the SV Node across separate list of DTC Nodes, which completely eliminate the case a wire tapper getting more than two fragments to his/her possession. This way invention, facilitate real time mitigation of any intrusion detection events or IDE and invention defines this as RIM, stands for Real time Intrusion Mitigation commands. Referring to FIG. 15, which is a table that list simple example of an embodiment showing list of IDE on column 1. 1 such intrusion event is a Ransomware attack. On the second column, 03 is the RIM code. Internally, protected system can enumerate this to any system specific operation that needs to be executed in the protected system. Any insider theft event is responded with code 02 and so on. This table is just an example and can be extended to a wide array of configurable commands and corresponding response codes, which becomes custom real time IT operations. Referring to FIG. 17, a flow chart further illustrates this aspect of the invention. At step 359, logic flow starts at USC. At step 361 it receives telemetry data from SG node. USC node then moves to parsing and processing step at 365 to find a configured rule, which is essentially a command code as explained above for RIM codes. At step 367 it decided to go back to start state as USC found nothing special to do or found matching rule and proceeds to step 369 where it extracts the code to execute the operation, which is referred as Contextual Risk Mitigation (CRM) code.

As each fragment is erasure code, information theoretic split of the data, data cannot be revealed even with a quantum computer, at least a multiple paths are wire-tapped, which is making the attack theoretically less practical. FIG. 4, FIG. 5, FIG. 6, FIG. 7, FIG. 8 and the FIG. 9 connection states of each DTC shown in the exemplary embodiment. Every DTC Nodes make a transport connection to every other Node. While invention add a new dimension of data routing at user content level, it still uses the underlying physical network routing mechanisms such as BGP or OSPF when the IP packets are routed. Source path routing mechanism of IP layer is not well accepted, and Segment Routing has limited support in some MPLS network. Invention make use of overlay routing at higher layers, making use of the observation that underlying packet routing make use of least cost path routing meaning, if a transport message is sent from US to Canada, it will never touch a Router in any country in India or Middle East. Invention use this observation of transporting content across different application layer paths, selected in such a way that, it is practically unlikely to go through the same physical routers carrying traffic in two distinct path lists of the DTC Nodes. As the invention has the mechanisms of selecting "n" unique paths, with at least packets of m different paths have to go through a same network device along the path, where m can be larger than 3, invention provide sufficient guarantee of eliminating wiretapping or data exposure risk in-motion, the same way it provides data exposure risk at rest, in the context of quantum computer attacks.

Referring to 14, a data is moved from DTC 1 to DTC 5. It can take three fragments across three different paths as shown by the three-exclusive list of DTC nodes in the table in each row. First fragment goes through nodes DTC 4 and DTC 3 between source and destination. Second fragment goes through DTC 2 and third one goes through DTC 6. In a reed Solomon coding of 5 fragments, only 3 is needed for full recovery and follow three different paths. This minimal amount of SP fragments needing for full recovery is termed as minimal set SP fragment split-set. This number varies as the total number of fragments varies. This configuration of N:M aspects of RS coding is done during configuration time at USC.USC has wide array of configuration parameters that defines the list of remote CRM operations supported, information regarding connected SG nodes, connected CFR nodes and a static list of exclusive CFR lists showing exclusive CFR list for every DTC node to every other DTC nodes, with at least 2 exclusive paths between any DTC to any other DTC. As none of the paths has overlapping DTC Nodes, all SP fragments will be routed across the different network device by the underlying IP routing layers. At every DTC, there is a configured list of exclusive paths to any other DTC for each SP fragment to be forwarded through, if content is originated at the DTC in question. As the invention is routing content at application level, a wire-tapping inter-me diary cannot determine the full sequence of the content, because connection is setup and terminated for every fragment of the content, in addition to EP forwarding aspects. Every DTC there is an Rx process that receives the incoming fragment. First 1024 bytes of every fragment contains CFR List and information regarding the next DTC to be forwarded to. Every DTC node updates the header with the next DTC information in the CFR list as the next hop and forwards it to the next DTC. End to end CFR list is created for a new fragment at the first DTC controller. This process is defined as EP forwarding continues until the last DTC node is hit by the fragment. In this case, n is 5 and m is 3. As reed Solomon and its variants allow high values such as n 90 and m 30, information theoretic algorithms can be modified to avoid the theoretical possibility of overlapping network devices, without overlapping DTC Nodes. Additionally, data can further be redacted with gaps in data, which is sent in different network path or anonymized or embedding gap blocks as explained earlier, with any existing data engineering methods to make the possibility to practically zero.

Figure 9:
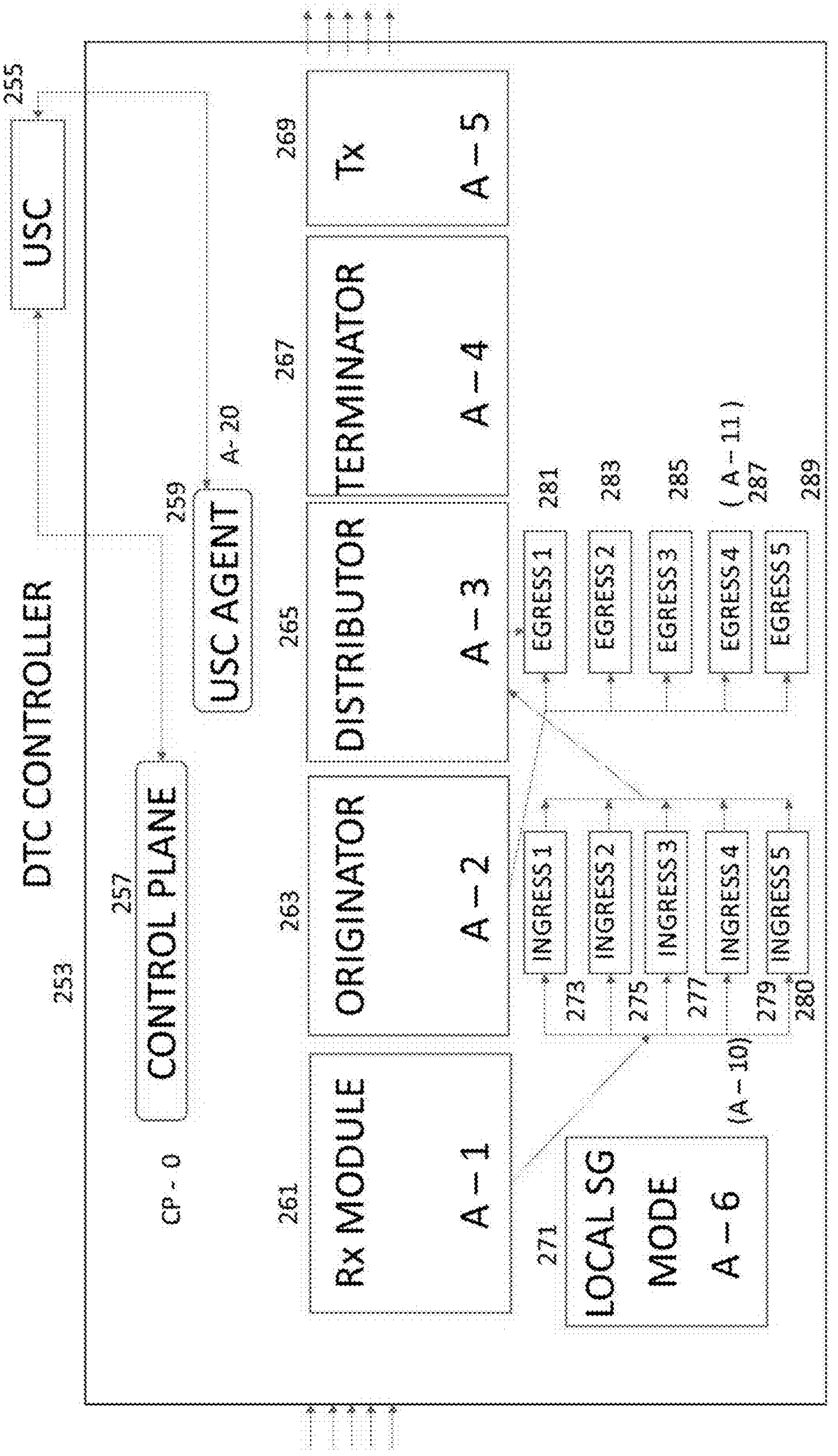
FIG. 9 shows the cross-section details of the DTC controller.
Figure 16:
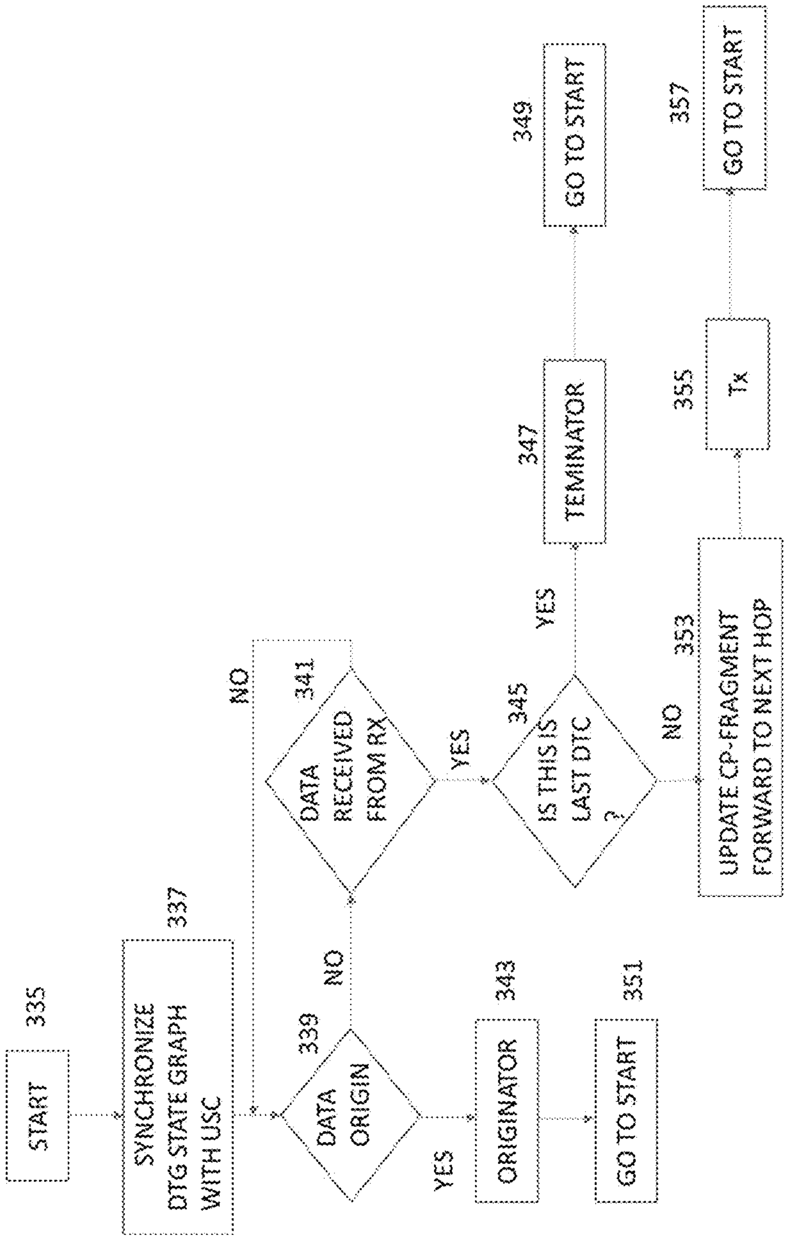
FIG. 16 is a high-level operational logic of a DTC node.

Referring to FIG. 9, a cross section of a specific DTC Node is explained. Control Plane, (labeled as 257) cp-0 receive various DTC route info updates and configures the DTC Nodes accordingly for the unique path selection logic. Rx (Receiver) module (labeled 261) A-1 receive the traffic from any of the connected DTC Nodes. Tx (Transmitter) module (labeled 269) will further forward the content to upstream DTC Nodes. Originator module (labeled as 263), A-1, will create the path list header and embed into the content if this is the first DTC Node of the data traffic. Distributor module (labeled as 265), A-3, will do the role of updating the DTC path list headers and move to the egress queue for the upstream traffic. Terminator module, (labeled 267) as A-4 will terminate the traffic if the current DTC is the last DTC Node in the list and initiate the content delivery to the target SG Node. A-10 (labeled with (273,275,277,279 and 280) and A-11 (labeled 281,283,285,287 and 289) are the ingress queue and egress queue respectively for the incoming and outgoing data traffic. A-6 (labeled as 271) is the local SG Node which can store data in SV Nodes or within the DTC system itself as required by the specific aspect of the embodiment in question. A-20 (labeled as 259) is the USC agent running in DTC Nodes as the security end point from USC (labeled as 255). DTC Node system itself is monitored for any intrusion, binary content verification of DTC modules. If there is any violation is detected at USC, USC will initiate intrusion detection actions that include bringing down the system as well. Referring to FIG. 16, a flow chart, 335 is the start step that includes starting the DTC node system itself. Step 337 indicates a synchronization phase of DTC with USC to get updated states of all DTC nodes in the overlay network. Essentially the list of all DTC nodes can be represented as a graph data structure as used for connected graph. Each DTC will initiate connections or send heartbeat messages in UDP, to check the availability and reachability. Each DTC then will build its DTC state graph. Which can also be represented as a plain list of N XML files for every other N DST nodes, where each XML file can represent a list of all combinations of routes to a given destination. This list can further be pruned by weeding out the entries containing common DST nodes, other than the source and destination. This is how a CFR List is created, which is inserted whenever new content is originated from the DTC. DTC keeps track of any DTC node in the overlay being down or back in operation and updates the DTC graph state. This process runs in the control plane, like similar ways a packet router update the forwarding table when there is a route change happens. It includes the IP addresses of every DTC nodes, port numbers to be used to contact Rx module of every DTC. DTC updates the list of Content Forwarding Routers (CFR) through which DTC Node can move the content through. DTC and CFR refer to same entity in the invention, using two terms to point to different aspects of the DTC (CFR). Every DTC can get an exclusive list of CFRs to reach to every other member, which refers to the CFR List. DTC then at step 339 check if the data originated its journey on this node, which is the case when connected SG nodes push the content to this node as the first node. If it is the case, it will execute the ORGINATOR module which will insert exclusive CFR List into each SP fragment. This can be at a fixed offset, typically before the fragment data start offset or any known offset. DTC nodes then push the fragment to egress queue and repeat the start step. This process is repeated for every SP fragment of the content. Only minimal set SP fragments need to be transmitted. DTC node checks if any data arrived from another DTC at step 341. If no data reception detected it goes back to start step. Otherwise, it checks if this is the last DTC in the CFR List at step 345. If this is the last node in the list, it has to terminate the fragment journey and wait for other fragments of the split-set to arrive, which is part of the fragment set represented in the initial header in the content. Once all fragments received, DTC will initiate content gap block request to receive the gap block metadata and gap block data. Using Gap block metadata, content offsets of the gap blocks are retrieved, and gap blocks are re-inserted and then retrieve the encryption key from the re-assembled content and CR operations begins. This is the logic of the terminator module. Every SP fragment will be preceded by an XML file, containing the original content name, total fragments needed, final destination DTC, next hop DTC information to facilitate all hop by hop and end to end processing. DTC information can be as simple as a DTC ID. DTC ID can be any unique no which can be configured at USC, which is distributed to all DTC. DTC is also referred as CFR interchangeably, as every DTC not as the first or the last DTC, it is functioning only as a forwarding node (Content Forwarding Router). Initial fragment header containing CFR List is only created at the first DTC.

Figure 18:
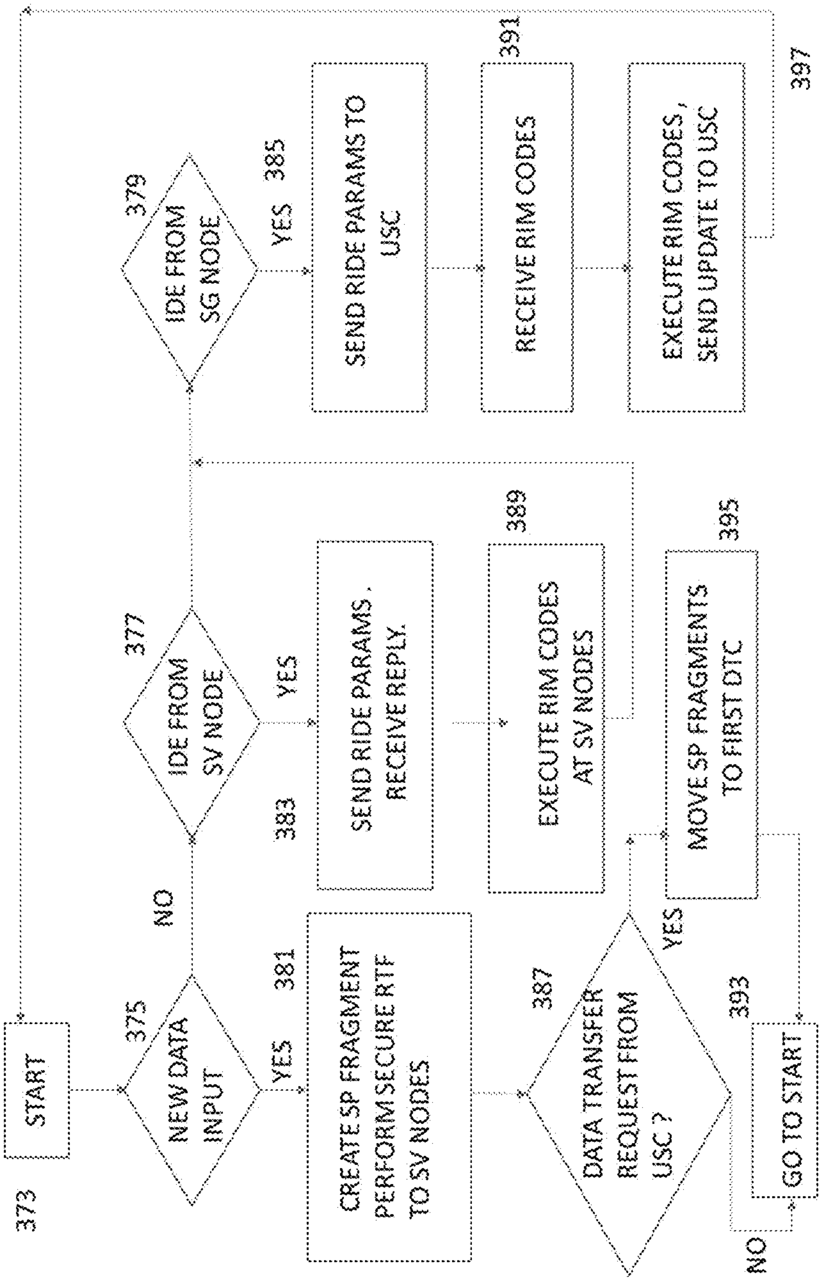
FIG. 18 is a high-level operational logic of an SG node.

If this is not the last DTC, at step 353, it will then advance the CFR List by one node and update the next Node information as the next hop CFR and update the CP fragment header as inserted by the ORIGINATOR and it transmit the fragment to next hop at step 355 and goes to start phase at step 357. Similar to the forwarding logic as explained above, it is also helpful to understand the operation logic of SG node that push content into DTC node or pull out of it in at least one embodiment. Referring to FIG. 18, which is a flow chart illustrate the SG node operation logic. At step 373 SG node starts up by syncing up with USC and other initialization steps. Then look at any new data arrival at step 375. If new data arrived, it will be converted into SP fragments and move the fragments to SV nodes through Secure RTF operation explained earlier. At step 387, it checks if there is a request from USC for any data transfer from SV nodes to CFR overlay. If this is the case, data transfer of SP fragments of the requested content to the first DTC attached to the SG node is performed and SG node goes back to initial step. At step 377 SG node detects any Intrusion Detected Event (IDE). If that is the case, it goes to step 383 wherein SG node send the IDE parameters in Real time. Invention refers this process of updating USC in real time with any IDE events is RIDE params exchange. At step 389 SG node send RIM codes received from USC to SV nodes. This can include a SHUTDOWN of the Secure Vault or can include the execution of any CRM operations that is generated from SG node which was in turn received from USC. At step 379 SG nodes checks if there is an IDE event at SG node itself. If found, it sends RIDE params to USC at step 385 and receive RIM codes from USC at step 391 and move on to the execution of the received RIM code at step 397 and goes to start state. RIDE parameters can include even abnormal events in system logs, audit logs. Aspects such as what log files of the system to be monitored, what directories and files to be protected, the system activity events to be considered as suspicious is termed as security parameters. USC issues various commands through RIM codes, for security control and is termed as security control commands in the disclosure. This facilitates storage prevention or SIPS (Storage Intrusion Prevention System) in real time.

One objective of the present disclosure is to provide an overlay network for secure inter-country data routing. The overlay network comprises a plurality of storage gateway (SG) nodes to fragment an original incoming data, a plurality of secure vault (SV) nodes for storing fragmented data, a plurality of data transport gateway (DTC) nodes to route data across set of end points, and a universal security controller (USC) node for populating routing paths to DTC nodes, wherein the USC node generates instructions to: store fragmented data at a first set of SV nodes; upon receiving command to transfer data across the set of end points, move the fragmented data from the first set of SV nodes to a first DTC node through the SG nodes, wherein the SG nodes transforms the fragmented data by appending the route header with the routing path; forward the data to destination through a set of DTC nodes predetermined in the routing path and upon termination of the forwarding, updating the SG nodes and re-distributing the fragmented data to a second set of SV nodes. In one embodiment, a subset of the DTCs, the first set of SV nodes and the second set of SV nodes can be located in different countries. The USC redistributes the fragmented data among the plurality of SV nodes spanning across countries to ensure quantum safe security for data in-transit and data at-rest, wherein quantum safe security ensures that the data is secure from cybersecurity threats using quantum computing, wherein the USC ensures storage security for data at-rest stored in SV nodes and storage security for data in-transit through the DTC nodes transported across wide area network (WAN). The USC performs monitoring storage IO activities and system activities taking place at SG nodes and SV nodes, receiving security telemetry data from the SG node and the SV nodes, analyzing the security telemetry data, sending security and intrusion response commands to the SG nodes and the SV nodes, and initiating the data transfer from the SV nodes to a first DTC node connected to the SG node. The SG node fragments original data by splitting the data based on information theoretic algorithms. The stored fragmented data is compressed, encrypted, and applied with deduplication services. The USC generates audit logs, monitors data tampering activity, and disallows all external network services from connecting to the SV nodes. Each of the SG node, the SV nodes and the DTC nodes comprise security and system agents to send various security activity and system activity to the USC. Further, each of the SG node, the SV nodes and the DTC nodes comprise data protection agents to protect and recover the data in the event of intrusion. The SV nodes are running in systems physically connected to a local area network devoid of open ports and static IP, to logically isolate from any other network. The DTC nodes are running in data servers hosted in different countries interconnected to one another forming a virtual private storage tunneling network. Further, the USC enables a customer to store data directly on to the network, wherein the SV nodes are replaced by cloud storage services, wherein the customer specifies the regions of storage services and country where the data has to be resident.

Referring to FIG. 2, 139 is the graph database of the USC (135). Graph Database contains all the connected states of all pairs of DTCs in the overlay. It is basically a standard graph-based data structure or even It can be represented in an XML based data structures. This information is used by an administrator of the USC or through automatic manner to generate reachability information and to create exclusive list of paths by Graph based algorithms that list paths from 1 node to another having exclusive set of nodes visited. This can be extended to different ways to suite different embodiments of the invention and is beyond the scope of the invention. Any means of path selection and node discovery can be used as far as invention concerned. 137 is the policy and CRM rules database of DB that facilitate what log events to match what RIM codes. This can be continuously updated by AIOps based ML rule engine, as it constantly detects log events. This can even be manually updated by editing XML files in at least one embodiment. More rules and command codes will expand the range of RIM response codes and RIDE matching. Continuous learning by Machine Learning engine can take contextual aspects of the log metrics as well. For example, response to a low memory condition when a bulk data backup is in progress is different from the case when there is no activity on new storage IO but simply when number of processes running are much higher than normal threshold. The second context indicates a Denial-of-Service attack or a Ransomware activity. This contextual information is deduced as Policy Database and CRM rules running in 137 get matured over continuous machine learning with more and more updates on what is normal activity happening in the system and what is abnormal activity. Rules DB of the USC, labeled as 137, essentially drives the AI and Automation aspect of CRM (Contextual Risk Mitigation) capabilities of USC.

Referring to FIG. 9, 273, 275,277,278 and 279 are the incoming queues of the DTC (253). Every DTC can have a dedicated queue for every expected DTC it can be connected to. Rx component of the DTC will receive and store the SP fragment in each of this queue, based on the source DTC. Similarly, 281,283,285,287 and 289 are the forwarding queues based on the next hop DTC that Tx Component will use to transmit the SP fragment. EP forward logic simply needs to receive a fragment, examine the next hop in the list, and move the fragment into the right queue. Tx component will then pick up and transmit to next hop. This logic is repeated in every DTC in CFR List as part of the EP Forwarding logic. By forcing the movement of fragment across a pre-destined list of DTC nodes, implicitly, path of the underlay packet routing is also altered without changing anything on the underlay packet routing stack. This process can be equated to a multi-layer packet routing-Routing at the content level, at overlay level for avoiding wiretapping, and underlay packet routing to move the packet physically. Standard VPN or MPLS based network virtualization only provide isolation of traffic or encryption-based support. As the invention primarily focus on moving away from encryption-based defense, in view of quantum computing attacks, leverage information theoretic defense by moving packets of unintelligible splits by information theory across distinct paths.

What is claimed is:

1. A system to implement a secure storage routing overlay network, the system comprising:

- a plurality of content forwarding router (CFR) nodes placed at a plurality of locations spanning countries and continents; and
- a Universal Security Controller (USC) node that receives telemetry data sent from the plurality of CFR nodes, wherein the USC node is communicatively connected to the plurality of CFR nodes for populating and updating node state information to the plurality of CFR nodes,
- wherein the USC node exchanges executable instructions with the plurality of CFR nodes and further comprising the steps of: creating split partition (SP) fragments at an ingress CFR node, updating each SP Fragment with an exclusive CFR List, at the ingress CFR node, moving the SP fragments from the ingress CFR node to an egress CFR node across an exclusive list of CFR nodes, whereas no overlapping CFR nodes exist between the ingress CFR node to the egress CFR node, terminating content transport at the egress CFR node, wherein each CFR node of the plurality of CFR nodes initializes a state graph, refreshes the node state information periodically, and establishes a separate connection setup at transport protocol level for content transmission between any two CFR nodes of the plurality of CFR nodes, wherein each CFR node of the plurality of CFR nodes exchanges security control commands, security parameters, and configuration parameters with the USC node, and wherein each CFR node of the plurality of CFR nodes initiates Contextual Risk Mitigation (CRM) operation based on the received command parameters from the USC node.

2. The system as claimed in claim 1, wherein moving the SP fragments from the ingress CFR node to the egress CFR node further comprises the steps of:

- selecting a CFR node from the exclusive CFR List as next hop by advancing the CFR List by one node,
- forwarding the SP fragments to the selected CFR node assigned as the next hop,
- repeating the above step at each CFR node listed in the exclusive CFR List successively until the content reaches the egress CFR node.

3. The system as claimed in claim 1, wherein the originator module is configured to

- insert the exclusive CFR List into each SP fragment and push the updated content to a forwarding queue at the ingress CFR node.

4. A method to implement a secure storage routing overlay network, using fragment based data transfer, the method comprising:

- exchanging security data, by a plurality of content forwarding router (CFR) nodes with a universal security controller (USC) node;
- populating and updating a node state information, by the USC node to the plurality of CFR nodes, wherein the USC node exchanges executable instructions with the plurality of CFR nodes and further comprising the steps of: creating split partition (SP) fragments at an ingress CFR node, updating each SP Fragment with an exclusive CFR List, by an originator module, at the ingress CFR node, moving the SP fragments across an exclusive list of CFR nodes, whereas no overlapping CFR nodes exist between the ingress CFR node and an egress CFR node, terminating content transport at the egress CFR node, wherein, each CFR node in the exclusive CFR List makes a transport protocol connection to every other CFR node in the exclusive CFR List and refreshes the node state information periodically, and wherein a separate connection setup is established for content transmission between any two CFR nodes of the plurality of CFR nodes, the plurality of CFR nodes exchange security control commands, security parameters, and configuration parameters with the USC node, initiate Contextual Risk Mitigation (CRM) operations based on the received command parameters from the USC node.

5. The method as claimed in claim 4, wherein moving the SP fragments from the ingress CFR node to the egress CFR node further comprises the steps of:

- selecting a CFR node from the exclusive CFR List as next hop by advancing the CFR List by one node,
- forwarding the SP fragments to the selected CFR node assigned as the next hop, repeating the above step at each CFR node listed in the exclusive CFR List successively until the content reaches the egress CFR node.

* * * * *